United States Patent
Takenaka

(10) Patent No.: US 6,876,903 B2
(45) Date of Patent: Apr. 5, 2005

(54) GAIT PATTERN GENERATING DEVICE FOR LEGGED MOBILE ROBOT

(75) Inventor: Toru Takenaka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 24 days.

(21) Appl. No.: 10/416,817

(22) PCT Filed: Nov. 16, 2001

(86) PCT No.: PCT/JP01/10026

§ 371 (c)(1),
(2), (4) Date: May 16, 2003

(87) PCT Pub. No.: WO02/40224

PCT Pub. Date: May 23, 2002

(65) Prior Publication Data

US 2004/0044440 A1 Mar. 4, 2004

(30) Foreign Application Priority Data

Nov. 17, 2000 (JP) ........................................ 2000-352011

(51) Int. Cl.⁷ .............................................. G05B 19/00
(52) U.S. Cl. ....................... 700/245; 700/247; 700/249; 700/250; 700/252; 700/253; 700/258; 318/568.15; 318/568.16; 318/568.17; 901/33; 901/47; 901/48
(58) Field of Search ................... 700/90, 245, 249–250, 700/252–253, 258–259; 318/568.15, 568.16, 568.17; 901/33, 47, 48; 180/8.5; 280/28.5; 701/23

(56) References Cited

U.S. PATENT DOCUMENTS

| | | | | |
|---|---|---|---|---|
| 2,555,753 A | * | 6/1951 | Montgomery | ................ 414/18 |
| 4,834,200 A | | 5/1989 | Kajita | |
| 5,186,062 A | * | 2/1993 | Roost | ........................ 73/865.4 |
| 5,355,064 A | | 10/1994 | Yoshino et al. | |
| 5,404,086 A | | 4/1995 | Takenaka et al. | |
| 5,974,366 A | * | 10/1999 | Kawai et al. | ................ 702/150 |
| 6,301,524 B1 | * | 10/2001 | Takenaka | .................... 700/245 |
| 6,364,040 B1 | * | 4/2002 | Klann | ........................ 180/8.1 |
| 6,478,314 B1 | * | 11/2002 | Klann | ........................ 280/28.5 |
| 6,481,513 B2 | * | 11/2002 | Buehler et al. | .............. 180/8.6 |
| 6,564,888 B1 | * | 5/2003 | Gomi et al. | .................. 180/8.6 |
| 6,697,709 B2 | * | 2/2004 | Kuroki et al. | .............. 700/245 |

FOREIGN PATENT DOCUMENTS

EP 0 965 416 A1 12/1999

* cited by examiner

Primary Examiner—Thomas G. Black
Assistant Examiner—McDieunel Marc
(74) Attorney, Agent, or Firm—Squire, Sanders & Dempsey L.L.P.

(57) ABSTRACT

A gait generation system of a legged mobile robot, in particular a biped robot that has the dynamic model expressing the relationship between the motion of the body and leg and the floor reaction force, and provisionally determines the current time gait parameters including at least parameters that determine leg trajectory and the like in response to a demand, supposes the parameters of a periodic gait, corrects the current time gait parameters such that the body trajectory determined from the dynamic model and the parameters of the current time gait, etc., converges to a body trajectory determined from the parameters of the periodic gait, and determines instantaneous values of the current time gait based on the corrected current time gait parameter. With this, the system can generates a gait of any stride, turning angle and walking period, including the floor reaction force acting on the legged mobile robot, that satisfies the dynamic equilibrium condition. Further, the system can generates a gait in such a manner that the displacement and velocity of each robot part are continues at the boundary of the generated gait and that succeeding thereto, can generate a gait that is high in the margin of stability, can predict future behavior of the robot and generate a gait such that no disadvantages such as posture divergence occurs.

16 Claims, 21 Drawing Sheets

FIG. 9
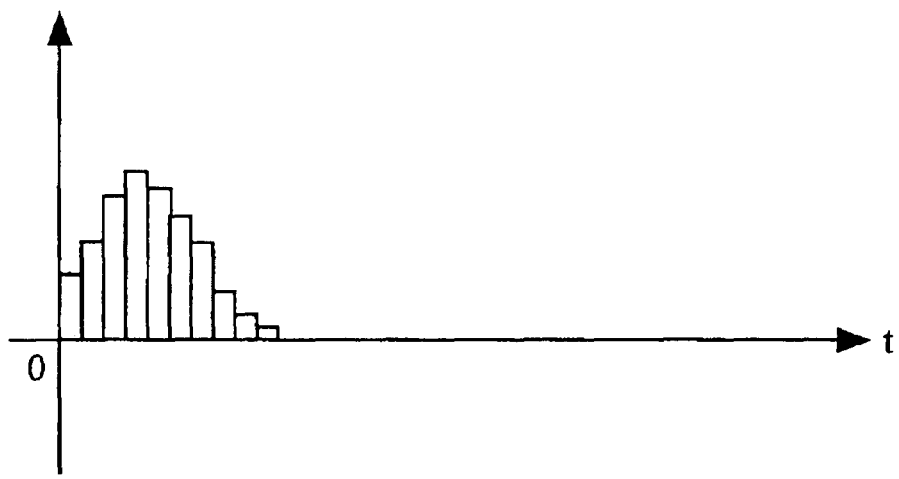
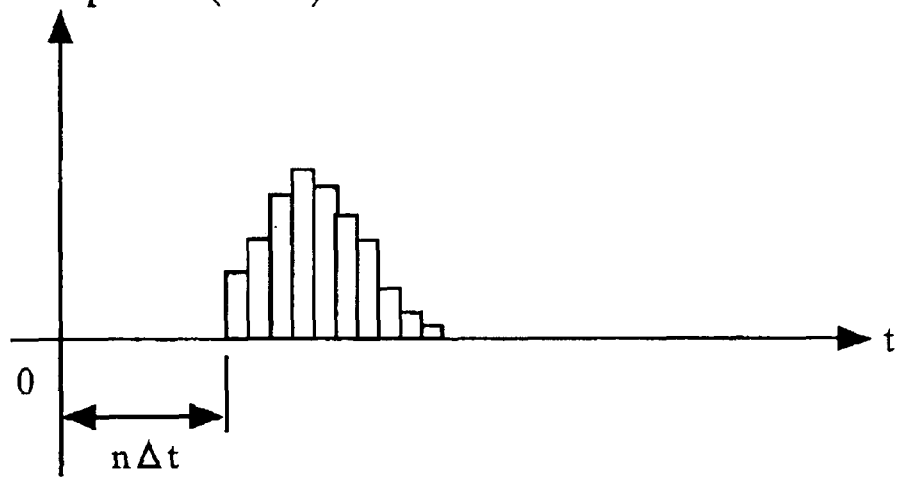

GAIT PATTERN GENERATING DEVICE FOR LEGGED MOBILE ROBOT

TECHNICAL FIELD TO WHICH THE INVENTION RELATES TO

The present invention relates to a gait generation system of a legged mobile robot, and more particularly to a system for generating or determining a gait freely on a real-time basis.

BACKGROUND ART OF THE INVENTION

The applicant proposes, in Japanese Laid-Open Patent Application No. Hei 10 (1998)-86081, conducting gait generation freely by converting a set of standard gaits, designed with the use of an off-line computer, into a set of time-series data including parameters and a body trajectory to be stored in a memory of a microcomputer mounted on a robot, and by calculating a weighted average of instantaneous values of individual gaits whose parameter relating to time such as a walking period are the same.

However, if a weighted average is calculated between individual gaits that are different in the time parameter such as the walking period, the generated gait does not satisfy the dynamic equilibrium condition even in an approximated manner. Thus, the proposed technique failed to generate a gait that is different from the standard gait in the walking period.

It should be noted here that the "dynamic equilibrium condition" indicates a situation where a ZMP determined from the gravity and inertial force of a desired gait is equal to a desired ZMP, to be more specifically, a situation where moment of the resultant force of the inertial force and gravity of the robot about the desired ZMP is zero. Here, the ZMP (Zero Moment Point) indicates a floor point at which the resultant force of the inertial force induced by motion and the gravity intersect the floor. More precisely, it indicates a point of action on the floor at which the moment of the resultant force of the inertial force induced by motion and gravity is zero except for its vertical component.

Further, in the proposed technique, since it is sometimes necessary to turn a desired ZMP away large from its expected trajectory so as to bring both the body position and velocity continuous at boundary of a gait of a walking step and that succeeding thereto, the margin of stability may occasionally lower.

Further, in order to realize various kinds of walking, the proposed technique requires a large number of standard gait time-series data to be stored and hence, needing an increased capacity of memory. Furthermore, a set of standard gaits must be prepared on an off-line computer by trial and error. In addition, when it is attempted to generate a gait that is quite different from the standard gait, the approximation is disadvantageously degraded markedly.

Aside from the above, since gait generation can not act against physical laws, gait parameters such as the ZMP should be determined within a permissible range of the physical laws. Moreover, assuming the dynamic system of a biped robot as a system that inputs the ZMP and outputs the body position, it is a divergence system. It therefore becomes necessary to prevent a behavior of robot from diverging by generated gait parameters. Here, "divergence" indicates, as shown in FIG. 8 referred to later, a body position of the biped robot deviates far away from its feet positions.

From this point of views, when generating gait on a real-time basis, it is preferable to predict future behavior that would occur in the robot by the generated gait, and to avoid divergence if the possibility of divergence is predicted.

However, as shown in FIG. 23, when a robot (biped robot) is modeled to have multiple material points, since the volume of calculation and the non-linearity of system increase, it is difficult for an on-board computer (mounted on the robot of ordinary performance) to determine gait terminal state on a real-time basis.

As regards the future behavior prediction and divergence prevention technique based thereon might be realized to a certain level, by, for example, storing various kinds of knowledge and by selecting a desired gait at every gait switching in response to the state and objective at that time from the stored knowledge. In practice, however, a trial to cope with all possible condition would cause an explosion of combination, and this method would actually be impossible.

Therefore, it is desired in the field of legged mobile robot technology to simplify a dynamic model that describes the robot dynamics in such a way that robot's future behavior can analytically be predicated in calculation on a real-time basis.

As typical robot dynamic models, following two models are known.

1) a model assigned with a single material point.

2) a model assigned with multiple material points (but, material points with less influence are neglected).

The single-material-point model of 1) is proposed in Japanese Patent Publication Hei 4 (1992)-15068. In the proposed technique, the robot is model as a single-material-point model in which the material point is only set at its body to ensure linearity such that it is controlled the body height to be constant. This model makes it easy to determine robot behavior analytically.

Since the biped robot in the proposed technique is quite small in weight, the leg reaction force can be neglected without leaving significant influence to exist. However, in case of a biped robot of humanoid type, since the mass of its leg is so large that it can not be neglected, if the proposed technique is adopted to the humanoid type robot, the accuracy of approximation will accordingly be degraded and the robot may, at worse, turn over if controlled to walk at a high speed.

As an example of the model of 2), it can be cited a model described in a paper "Biped Walking Control Method Adapting to an Unknown Uneven Surface" (Journal of the Robotics Society of Japan; Vol. 13 No. 7; October, 1995).

In the proposed technique, the material points are set on knees and ankles of each leg and on the body. More specifically, the individual material points are set on fixed points (coordinate) in coordinate systems set locally on its links and joints. When comparing this model with that shown in FIG. 23 (in which the material points and inertia are set at every link), the model of 2) can decrease the volume of calculation to $\frac{1}{10}$ or thereabout. In addition, the accuracy of approximation of the model of 2) will be improved than the model of 1) and even a robot having a large-mass leg can walk in accordance with gaits generated by the technique mentioned in the paper.

However, since the non-linearity in the model of 2) is still excessive, like the model shown in FIG. 23, it is not possible to use the model of 2) for predicting future behavior analytically so as to avoid divergence.

DISCLOSURE OF THE INVENTION

A first object of the present invention is to eliminate the drawbacks of the technique proposed in Japanese Laid-Open Patent Application No. Hei 10(1998)-86081 proposed by the applicant and the prior art model simplification techniques mentioned above, and to provide a gait generation system of legged mobile robot which can generate a gait (including floor reaction force that satisfies dynamic equilibrium condition) of the legged mobile robot freely and on a real-time basis in such a way that a robot walking at any stride, turning angle and walking period, etc., are realized.

A second object of the present invention is to eliminate the drawbacks of the technique proposed earlier and the prior art model simplification techniques mentioned above, and to provide a gait generation system of legged mobile robot which can generate a gait of the legged mobile robot freely and on a real-time basis in such a way that position and velocity of every robot part is continuous at boundary between the generated gaits with high margin of stability.

A third object of the present invention is to provide a gait generation system of legged mobile robot which can predict future behavior of the legged mobile robot and prevent disadvantages such as divergence from occurring.

A fourth object of the present invention is to provide a gait generation system of legged mobile robot which can ensure real-time gait generation with high speed calculation.

In order to achieve the objects, the present invention provides, as defined in claim 1, a system for generating a gait of a legged mobile robot having at least a body and a plurality of legs each connected to the body, comprising: a dynamic model that expresses relationship between motion of the leg and the body, and a floor reaction force; current time gait parameter provisionally-determining means for provisionally determining parameters of a current time gait including at least parameters determining a trajectory of the leg and a trajectory of the floor reaction force, in response to at least a demand; periodic gait parameter supposing means for supposing the parameters of a periodic gait succeeding to the current time gait in response to at least the demand; current time gait parameter correcting means for correcting at least the provisionally determined parameters of the current time gait such that the trajectory of the body determined based on the dynamic model and the parameters of the current time gait and the periodic gait succeeding thereto substantially converges or becomes equal to a trajectory of the body of the periodic gait determined from the parameters of the periodic gait; and current time gait instantaneous value determining means for determining instantaneous values of the current time gait based on at least the corrected parameters of the current time gait.

Since it is configured to have a dynamic model that expresses relationship between motion of the leg and the body and a floor reaction force, provisionally determines parameters of a current time gait including at least parameters determining a trajectory of the leg and a trajectory of the floor reaction force, in response to at least a demand, supposes the parameters of a periodic gait succeeding to the current time gait, corrects at least the provisionally determined parameters of the current time gait such that the trajectory of the body determined based on the dynamic model and the parameters of the current time gait and the periodic gait succeeding thereto substantially converges or becomes equal to a trajectory of the body of the periodic gait determined from the parameters of the periodic gait, and determines instantaneous values of the current time gait based on at least the corrected parameters of the current time gait, the system can generate, freely and on a real-time basis, a gait of any stride, turning angle and walking period, including the floor reaction force acting on the legged mobile robot, that satisfy the dynamic equilibrium condition.

Further, the system can generates a gait in such a manner that the displacement and velocity of each robot part are continues at the boundary of the generated gait and that succeeding thereto, can generate a gait that is high in the margin of stability, can predict future behavior of the robot to generate a gait such that no disadvantages such as posture divergence occurs. Furthermore, the system can ensure real-time gait generation with high speed calculation. The dynamic model may be a single-material-point model such as that disclosed in Japanese Patent Publication No. Her 4 (1992)-15068.

As defined claim 2, there is provided a system for generating a gait of a legged mobile robot having at least a body and a plurality of legs each connected to the body, comprising: a dynamic model that expresses relationship between motion of the leg and the body, and a floor reaction force; current time gait parameter provisionally-determining means for provisionally determining parameters of a current time gait including at least parameters determining a trajectory of the leg and a trajectory of the floor reaction force, in response to at least a demand; periodic gait parameter supposing means for supposing the parameters of a periodic gait succeeding to the current time gait in response to at least the demand; periodic gait boundary divergent component determining means for determining a periodic gait boundary divergent component that is a value indicating a divergent component at gait boundary when behavior of the body of the periodic gait is approximated by the dynamic model, based on the parameters of the periodic gait; current time gait parameter correcting means for correcting the parameters of the current gait such that the divergent component becomes equal to or becomes substantially equal to each other at terminal of the current gait generated with use of the dynamic model; and current time gait instantaneous value determining means for determining instantaneous values of the current time gait based on at least the corrected parameters of the current time gait. With this, the system can achieve the same advantages and effects as those mentioned with reference to claim 1.

As defined in claim 3, it is configured that a transitional gait is inserted between the current time gait and the periodic gait succeeding thereto. With this, in addition to the advantages and effects mentioned with reference to claim 1, since a constraint condition (boundary condition) in determining or setting the periodic gait becomes loose and it becomes possible to determine the to be closer to that desired, the margin of stability of the gait is made higher.

As defined in claim 4, it is configured that the transitional gait includes a standstill gait. With this, in addition to the advantages and effects mentioned with reference to claim 1, the determination of the divergent component at the boundary of the periodic gait is made easier and the margin of stability of at sudden stop is made higher.

As defined in claim 5, there is provided a system for generating a gait of a legged mobile robot having at least a body and a plurality of legs each connected to the body, comprising: leg reaction force calculating means for calculating a leg reaction force that is a resultant force of inertial force and gravity induced by a motion of the leg, without depending on behavior of the body; inverted pendulum model supporting point position calculating means for calculating a position of a supporting point of an inverted pendulum that describes dynamic behavior of the body, from at least the calculated leg reaction force and a desired floor reaction force; inverted pendulum displacement calculating means for calculating displacement of the inverted pendulum based on at least the calculated position of the supporting point of the inverted pendulum; body position calculating means for calculating a position of the body based on at least the calculated displacement of the inverted pendulum; and gait generating means for generating a gait based on at least the calculated position of the body.

Since it is configured to calculate a leg reaction force that is a resultant force of inertial force and gravity induced by a motion of the leg, without depending on behavior of the body, calculate a position of a supporting point of an inverted pendulum that describes dynamic behavior of the body, from the calculated leg reaction force and a desired floor reaction force, calculate displacement of the inverted pendulum based on the calculated position of the supporting point of the inverted pendulum, calculate a position of the body based on the calculated displacement of the inverted pendulum, generate a gait based on the calculated position of the body, the system can simplify the dynamic model that models the legged mobile robot and can enhance the linearity of the model.

Specifically, assuming the legged mobile robot as a biped robot, since the dynamic behavior is described by the inverted pendulum and all the forces are converted into a value indicative of the floor reaction force (more specifically, the ZMP), it becomes possible to achieve linear-combination of behavior of the robot body, and hence it becomes possible to conduct predictive calculation as to whether behavior of the model diverges on a real-time basis, thereby enabling to generating a gait that is more stable in dynamics.

As defined in claim 6, there is provided a system for generating a gait of a legged mobile robot having at least a body and a plurality of legs each connected to the body, comprising: leg ZMP calculating means for calculating a leg ZMP that is corresponding to a ZMP of the leg that is a pseudo value of a resultant force of inertial force and gravity induced by a motion of the leg, without depending on behavior of the body; inverted pendulum model supporting point position calculating means for calculating a position of a supporting point of an inverted pendulum that describes dynamic behavior of the body, from at least the calculated ZMP and a desired ZMP; inverted pendulum displacement calculating means for calculating displacement of the inverted pendulum based on at least the calculated position of the supporting point of the inverted pendulum; body position calculating means for calculating a position of the body based on at least the calculated displacement of the inverted pendulum; and gait generating means for generating a gait based on at least the calculated position of the body. With this, the system can achieve the same advantages and effects as those mentioned with reference to claim 5.

As defined in claim 7, it is configured that the inverting pendulum model supporting point calculating means calculates the supporting point of the inverted pendulum by subtracting a product obtained by multiplying the leg ZMP by a second coefficient from a product obtained by multiplying the desired ZMP by a first coefficient. With this, it becomes possible to achieve linear-combination of behavior of the robot body more completely, and hence it becomes possible to conduct predictive calculation as to whether behavior of the model diverges on a real-time basis, thereby enabling to generating a gait that is more stable in dynamics. Further, since it becomes possible to generate a motion (other than the gait) on a real-time basis, it becomes possible to combine the motion and the gait smooth.

As defined in claim 8, there is provided a system for generating a gait of a legged mobile robot having at least a body and a plurality of legs each connected to the body, comprising: a dynamic model having; a leg reaction force calculating means for calculating a leg reaction force that is a resultant force of inertial force and gravity induced by a motion of the leg, without depending on behavior of the body; inverted pendulum model supporting point position calculating means for calculating a position of a supporting point of an inverted pendulum that describes dynamic behavior of the body, from at least the calculated leg reaction force and a desired floor reaction force; inverted pendulum displacement calculating means for calculating displacement of the inverted pendulum based on at least the calculated position of the supporting point of the inverted pendulum; and body position calculating means for calculating a position of the body based on at least the calculated displacement of the inverted pendulum; current time gait parameter provisionally-determining means for provisionally determining parameters of a current time gait including at least parameters determining a trajectory of the leg and a trajectory of the floor reaction force, in response to at least a demand; periodic gait parameter supposing means for supposing the parameters of a periodic gait succeeding to the current time gait in response to at least the demand; periodic gait boundary divergent component determining means for determining a periodic gait boundary divergent component that is a value indicating a divergent component at gait boundary when behavior of the body of the periodic gait is approximated by the dynamic model, based on the parameters of the periodic gait; current time gait parameter correcting means for correcting the parameters of the current gait such that the divergent component becomes equal to or becomes substantially equal to each other at terminal of the current gait generated with use of the dynamic model; and current time gait instantaneous value determining means for determining instantaneous values of the current time gait based on at least the corrected parameters of the current time gait. With this, the system can achieve the same advantages and effects as those mentioned with reference to claims 1 and 5.

As defined in claim 9, it is configured that the floor reaction force includes at least a ZMP. With this, in addition to the advantages and effects mentioned with reference to claims 1 and 5, it becomes easy to describe the floor reaction force, thereby enabling to have the advantages and effects more firmly.

As defined in claim 10, it is configured that the inverted pendulum is a linear model. With this, the system can achieve the same advantages and effects as those mentioned with reference to claims 1 and 5, in particular in claim 5.

BRIEF DESCRIPTION OF THE DRAWINGS

FIG. 9 is a set of time charts showing the pseudo ZMP value ZMPpend, in discretized form, indicative of the supporting point of the inverted pendulum of the dynamic model illustrated in FIG. 5;

FIG. 13 is an explanatory view explaining steady turning gait to be used in the processing of the flow chart of FIG. 12, from a landing position and the like;

FIG. 14 is an explanatory view explaining a body trajectory of the steady turning gait to be used in the processing of the flow chart of FIG. 12, from the landing position and the like;

DETAILED DESCRIPTION OF THE PREFERRED EMBODIMENTS

The gait generation system of a legged mobile robot according to the present invention will be explained with reference to the accompanied drawings. A biped robot is taken as an example of the legged mobile robot.

Figure 1:
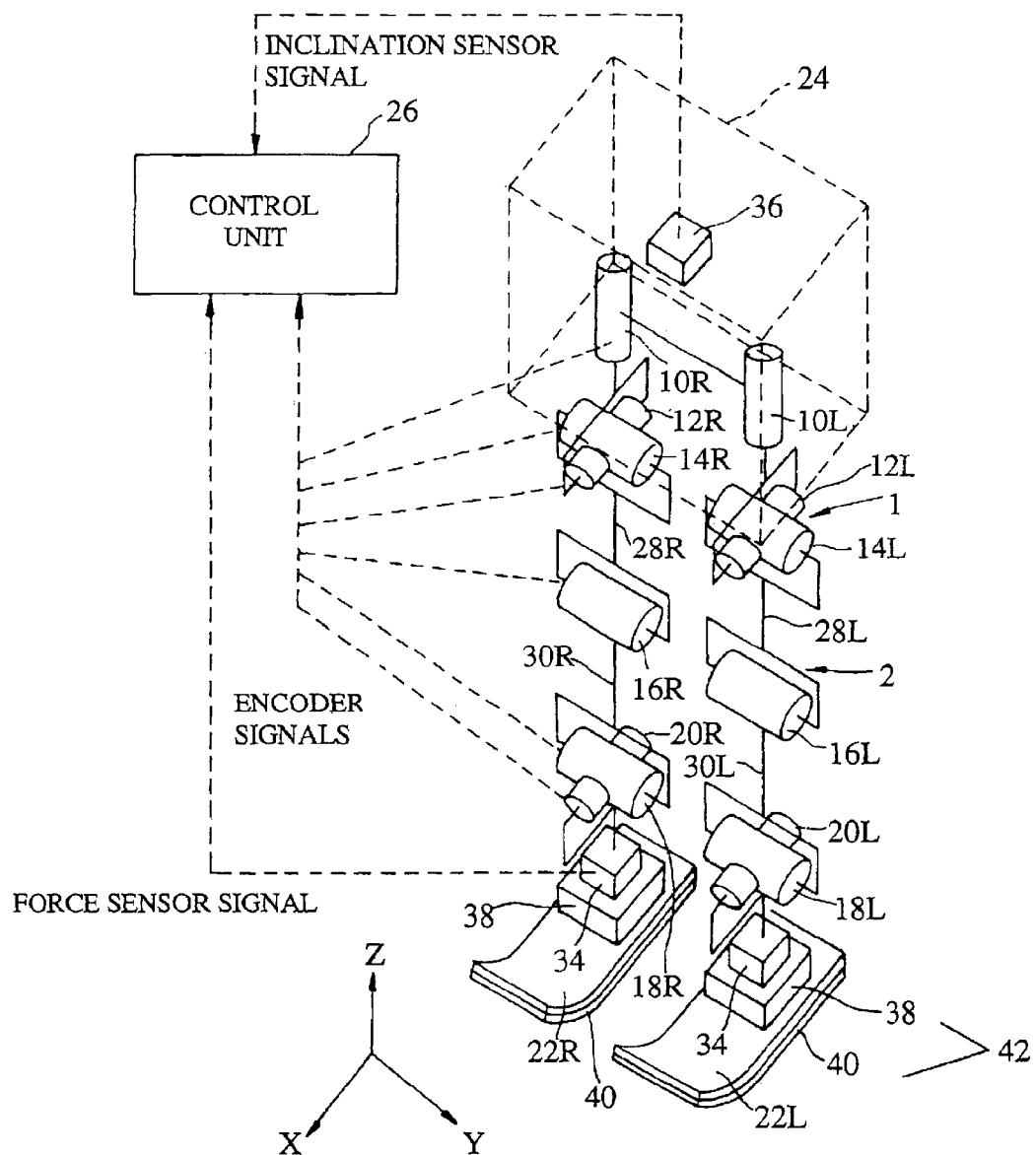
FIG. 1 is a schematic view showing an overall configuration of a gait generation system of a legged mobile robot according to an embodiment of the present invention.

FIG. 1 is a schematic view showing an overall configuration of the gait generation system according to the present invention.

As illustrated in the figure, a biped robot (hereinafter simply referred to "robot") 1 has a pair of right and left legs (leg links) 2 each composed of six joints. The six joints include, arranged successively downward, a pair of hip joints 10R, 10L (the right-hand joint is indicated by R and the left-hand joint by L) for rotating legs with respect to hips, a pair of hip joints 12R, 12L in the rolling axis (about an X-axis), a pair of hip joints 14R, 14L in the pitching axis (about a Y-axis), a pair of knee joints 16R, 16L in the pitching axis, a pair of ankle joints 18R, 18L in the pitching axis, and a pair of joints 20R 20L in the rolling axis.

The robot is provided with feet 22R, 22L underneath of the joints 18R(L) and 20R(L), and a body (trunk) 24 at its top which houses a control unit 26 comprising microcomputers (explained later). In the above, the joints 10R(L), 12R(L), 14R(L) make up the hip joints, and the joints 18R(L), 20R(L) make up the ankle joints. The hip joints and knee joints are connected to each other by thigh links 28R, 28L, and the knee joints and ankle joints are connected to each other by crus or shank links 30R, 30L.

Further, two arms are connected at upper parts of the body 24 and a head is provided at the top of the body 24. However, since the upper configuration does not have direct relationship with the gist of the present invention, the illustration is omitted.

With the above structure, each of the legs 2 is given six degrees of freedom. When the 6*2=12 joints are driven to suitable angles during walking, a desired motion is imparted to the entire leg structure to cause the robot to walk arbitrarily in a walking environment of three-dimensional (absolute) space. (In the specification, "*" represents multiplication in scalar calculation and outer product in vector calculation.).

It should be noted that a position and a velocity of the body 24 indicate a position and its displacement velocity of a predetermined position of the body 24, specifically a representative point of the body 24.

As shown in FIG. 1, a known force sensor (more precisely, known as the six-axis force and torque sensor) 34 is disposed at a position below each ankle joint for generating a signal indicative of three directional components Fx, Fy, Fz of force and three directional components Mx, My, Mz of torque or moment thereby of the force and outputs a signal indicative of foot landing and the floor reaction force (the load acting from the floor). Moreover, the body 24 has an inclination sensor 36 which generates a signal indicative of inclination with respect to a Z-axis (the vertical direction (the direction of gravity)) and its angular velocity. The electric motors of the respective joints are coupled with respective rotary encoders which generate signals indicative of angular displacements of the electric motors.

Figure 2:
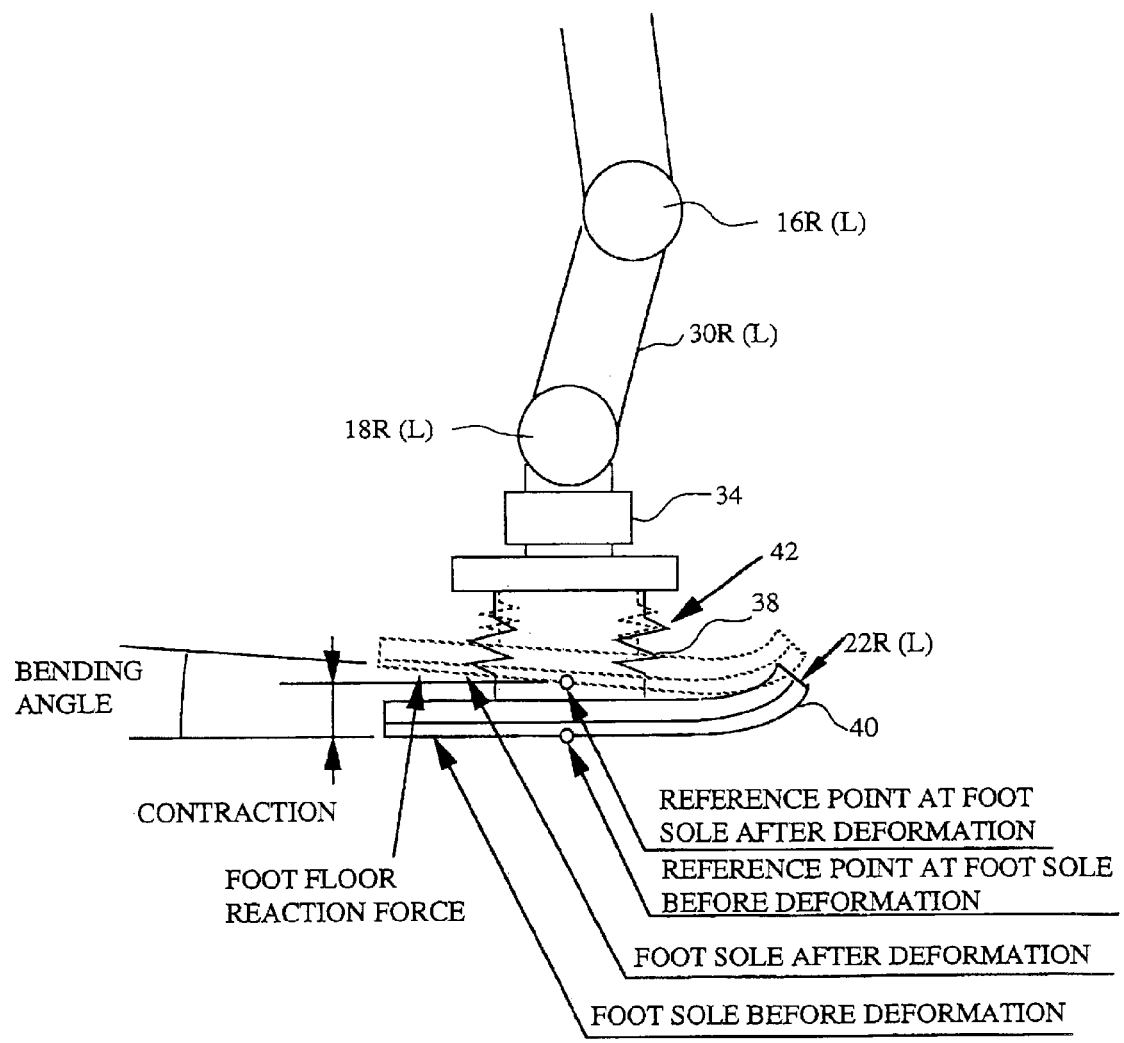
FIG. 2 is an explanatory side view showing the structure of the foot of a legged mobile robot illustrated in FIG. 1.

As illustrated in FIG. 2, a spring mechanism 38 is installed at a position upward from the foot 22R(L), which constitutes a compliance mechanism 42 together with a sole elastic member 40 attached to the sole of the foot 22R(L).

The spring mechanism 38 has a box-like guide member (not shown) connected to the foot 22R(L), and a piston member (not shown) connected to the side of the ankle joint 18R(L), 20R(L) and the force sensor 34 and inserted in the guide member with an elastic member such that it moves in the guide member to a slight extent.

In the figure, the foot 22R(L) illustrated in thick lines shows a condition where no floor reaction force is imparted. When subjected to the floor reaction force, the spring mechanism 32 and the sole elastic member 34, which constitute the compliance mechanism 42, deform such that the foot 22R(L) shifts to the position and posture illustrated in dashed lines. This configuration is significant not only for decreasing the foot-landing impact, but also for enhancing the control performance. Since this configuration is disclosed in an application (Japanese Laid-Open Patent Application No. Hei 5 (1993)-305584) proposed by the applicant, no further explanation will be made.

Although not shown in FIG. 1, a joystick 44 is provided at an appropriate location of the biped robot 1, which enables an operator from the outside to input a demand on gait, such as changing from straight advance to turning.

Figure 3:
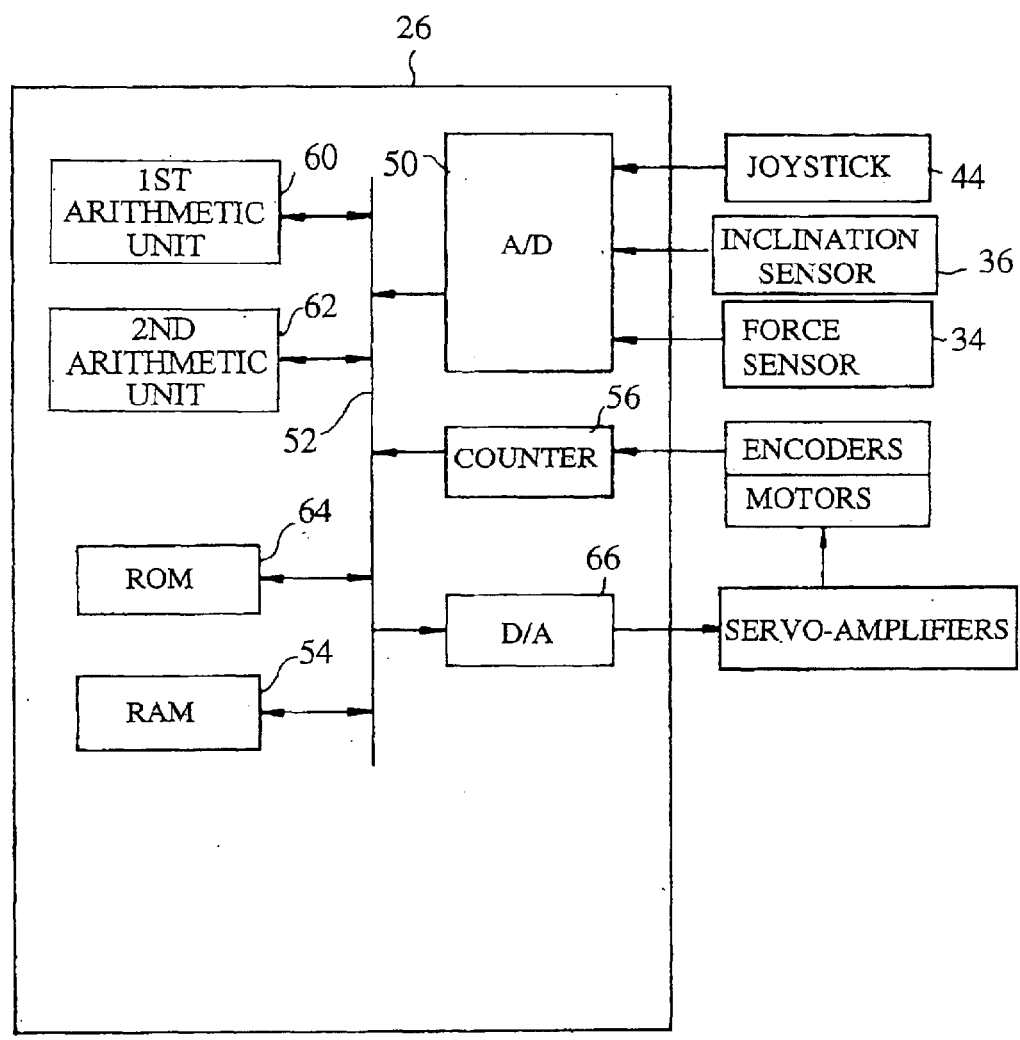
FIG. 3 is a block diagram showing details of a control unit mounted on the robot illustrated in FIG. 1.

FIG. 3 is a block diagram which shows the details of the control unit 26 comprised microcomputers. Outputs from the inclination sensor 36, etc., are converted into digital signals by an A/D converter 50 and are then transmitted through a bus 52 to a RAM 54. Output signals from the rotary encoders that are disposed adjacent to the respective electric motors are transmitted through a counter 56 to the RAM 54.

The control unit 26 includes a first arithmetic unit 60 and a second arithmetic unit 62 respective of which comprises a CPU. As will be explained later, the first arithmetic unit 60 conducts the gait generation, calculates joint angle displacement commands, and outputs the same to the RAM 54. The second arithmetic unit 62 reads the commands and the detected values from the RAM 54, and calculates values (manipulated variables), and outputs the same through a D/A converter 66 and servo-amplifiers to the electric motors which drive the respective joints.

Figure 4:
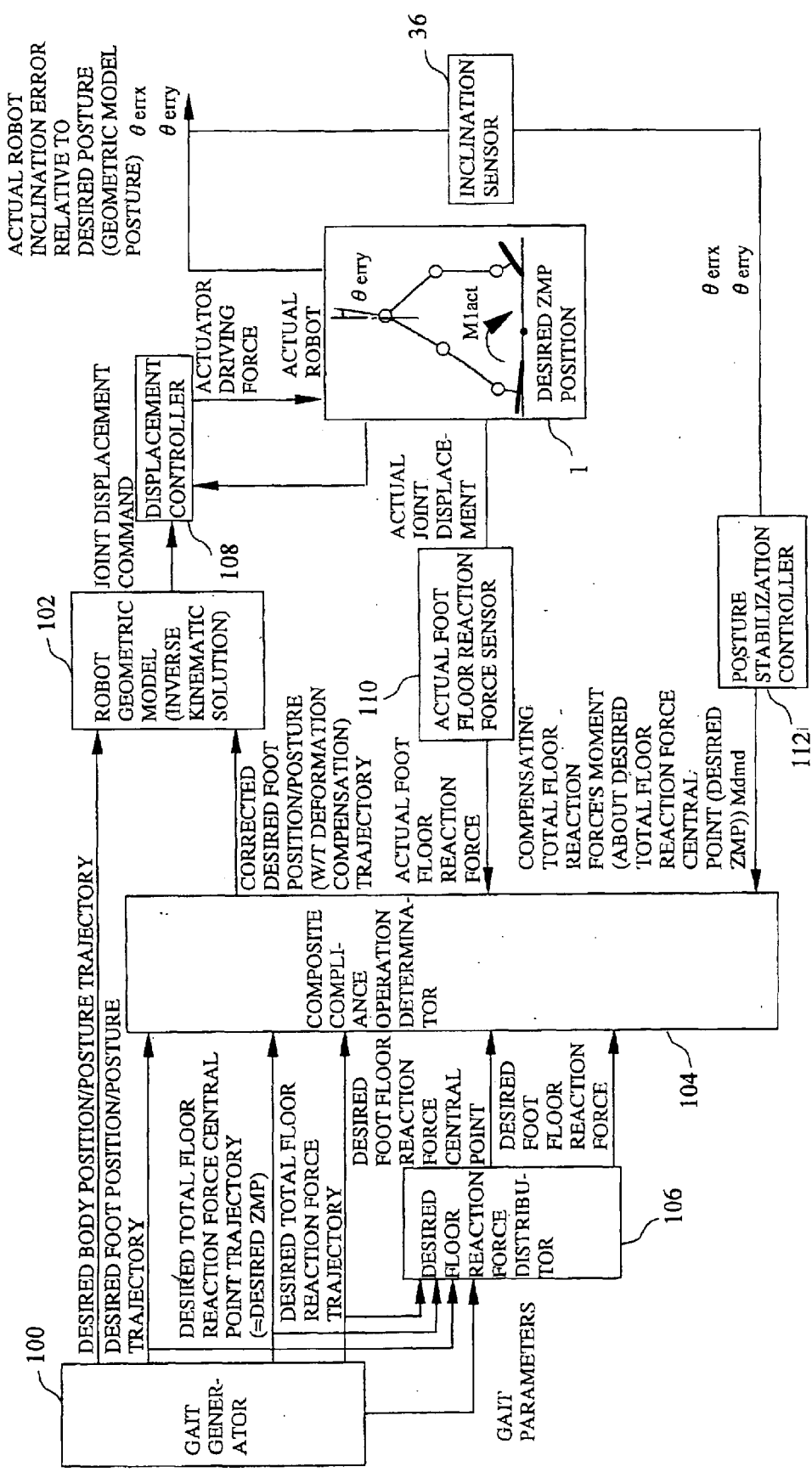
FIG. 4 is a block diagram showing the configuration of the gait generation system of a legged mobile robot illustrated in FIG. 1 in a functional manner.

FIG. 4 is a block diagram showing overall configuration and operation of the gait generation system of legged mobile robot according to the embodiment.

Explaining this, the system includes a gait generator 100 which generates a desired gait freely and on a real-time basis and outputs them as will be explained later. The desired gait comprises a desired body position and posture (trajectory), a desired foot position and posture (trajectory), a desired total floor reaction force central point (desired ZMP) (trajectory) and a desired total floor reaction force (trajectory or pattern).

The floor reaction force acting on each foot 22R(L) is called a "foot floor reaction force", whilst the resultant force of the foot floor reaction forces acting on both feet is called a "total floor reaction force". Since the foot floor reaction force will rarely been referred to in the following, the "floor reaction force" will be used as the "total floor reaction force" if it is not specifically described.

Explaining first the gait to be generated by the system, the present invention aims to provide a system which generates a gait on a real-time basis as mentioned above. More specifically, the present invention aims to generate a desired gait freely which is necessary for conducting the robot posture stability control utilizing the composite compliance control proposed earlier by the applicant in Japanese Laid-Open Patent Application No. Hei 10 (1998)-277969.

In the posture stability control proposed earlier, an error between a desired position and the detected position of the floor reaction force (ZMP) is determined, and either or both of the legs are moved to decrease the error, thereby ensuring posture stability. When the robot is about to turn over, the desired floor reaction force is intentionally shifted so as to shift the actual floor reaction force, thereby restoring the robot posture stability.

In a legged mobile robot, thus, it is impossible to ensure stable walking or locomotion unless the relationship between the desired motion trajectory and the desired floor reaction force pattern satisfies the dynamic equilibrium condition. To satisfy the dynamic equilibrium condition means, to be more specific, that the central point of the desired floor reaction force (the point of action on the floor at which the secondary moment of the desired floor reaction force distribution becomes zero) is equal to the ZMP. If they do not accord with each other, when the compliance control is operative, the robot loses balance between the resultant force of the inertial force and gravity and the floor reaction force and will, at worse, turn over.

In the technique proposed earlier, this is deliberately utilized to restore stability when the robot is about to turn over. As is understood from the above, the legged mobile robot should have, as desired values in the control of locomotion, not only the desired motion pattern, but also the desired floor reaction force pattern that satisfies the dynamic equilibrium condition against the desired motion pattern.

The desired floor reaction force is generally described by a point of action and by a force and moment acting thereat. Since the point of action can be set at any point, desired floor reaction force has numerous descriptions. However, if the desired floor reaction force is described by selecting the aforesaid desired floor reaction force central point as a point of action, the moment of force is zero except for its vertical component.

As stated above, in a gait that satisfies the dynamic equilibrium condition, since the ZMP calculated from the desired motion trajectory and the desired floor reaction force central point are equal to each other, the desired ZMP trajectory can be used in lieu of the desired floor reaction force central point trajectory.

Therefore, the above can be rewritten as; "the legged mobile robot should have, as desired values in the control of locomotion, not only the desired motion pattern or trajectory, but also the desired ZMP trajectory (desired floor reaction force pattern)".

Based on the above, the desired gait is defined in this specification as follows:

a) The desired gait is, in a broad sense, a set of the desired motion trajectories and the desired floor reaction force pattern over a period of a walking step or steps.

b) The desired gait is, in a narrow sense, a set of the desired motion trajectories and the ZMP trajectory for a period of a single walking step.

c) A series of walking is comprised of a series of gaits.

Hereinafter, for a more rapid understanding, the desired gait is used to represent that gait defined in the narrow sense, unless it is mentioned to the contrary. Specifically, the desired gait is used to mean a gait for a period beginning from the initial state of a two-leg supporting period to the terminal state of a one-leg supporting period succeeding thereto. Here, needless to say, the two-leg supporting period means a period during which the robot 1 supports its weight with two legs 2, whereas the one-leg supporting period means a period during which the robot supports its weight with one of the two legs 2. The leg (leg link) 2 which does not support the robot weight during the one-leg supporting period is called the free leg. Since the definitions are described in detail in the proposed application (Hei 10(1998)-86081), no further explanation will be made.

The object of the present invention is to generate the desired gait defined above freely and on a real-time basis. If such a gait can be generated freely and on a real-time basis, it becomes possible, for example, for an operator to manipulate the robot 1 by remote control. Moreover, in manipulating the robot automatically, it becomes possible not only to control the robot to walk in accordance with a predetermined sequence, but also to guide the robot to walk along a path or to effect high precision positioning.

Here, conditions which the desired gait must satisfy will be explained.

The conditions which the desired gait must satisfy will generally be classified into the following five:

Condition 1) The desired gait must satisfy the dynamic equilibrium condition. In other words, the ZMP trajectory calculated dynamically from the desired motion trajectories of the robot 1 should accord with the desired ZMP trajectory.

Condition 2) When a demand(s) on stride or in the angle of turning, etc., is made by a locomotion planner or path planner (neither shown) of the robot 1 or by an operator, the desired gait must satisfy the demand(s).

Condition 3) The desired gait must satisfy constraint condition in kinematics such as that the robot foot must not dig or scrape the floor on which it walks, the joint angle must be within a movable range, and the joint angular velocity must not exceed a permissible range.

Condition 4) The desired gait must also satisfy conditions of constraint in dynamics such as the ZMP having to remain within the foot sole floor-contact area during the one-leg supporting period, and that the joint torque must not exceed a possible maximum power of the joint actuators.

Condition 5) The desired gait must satisfy boundary condition. As a matter of course, condition 1) results in the boundary condition that the position and velocity of robot's each part such as the body must be continuous in the gait boundary. (If not, infinite force would occur or the ZMP would move far away from the foot sole floor-contact area).

More specifically, the initial state of n+1-th gait should correspond to the terminal state of n-th gait, especially in the body position, posture and velocity relative to the foot position. If the initial state of n+1-th gait is already determined, it suffices if the terminal state of n-th gait is accorded with the n+1-th gait initial state. If not determined, it suffices if the terminal state of n-th gait is within a range that ensures continuous walking without losing posture stability. However, as will be discussed later, it is quite difficult to determine the terminal state range which ensures continuous walking without losing posture stability.

Generally speaking, the desired gait is generated by a gait generation algorithm including parameter values or time-series table data. (In other words, to determine a gait means to determine the parameter values or time-series table data appropriately.)

Various kinks of gaits can be generated by changing the parameter values or time-series table data. However, if the parameters or time-series table data are determined without paying careful attention, it is uncertain whether the generated gait can satisfy all of the conditions mentioned above.

In particular, when generating the body trajectory satisfying condition 1) based on the ZMP trajectory by a gait generation algorithm, even if the ranges, suitable for continuous walking, of the body position and velocity at the gait terminal are known, it is difficult to determine the parameters relating to the ZMP trajectory such that both the body position and velocity will fall within the range at the gait end.

The reasons of the difficulty are as follows:

Reason 1) The robot body tends, once begins to move away from the ZMP, to move farther away therefrom. This will be explained using an inverted pendulum model which approximates the behavior of the robot body.

If the inverted pendulum's supporting point deviates from a floor point (projected from its center of gravity, the deviation diverges and the pendulum turns over. Even at the time of turnover, the resultant force of the inertial force and gravity of the inverted pendulum is acting on the supporting point (in other words, the ZMP is kept equal to the supporting point), and the resultant force is kept balanced with the floor reaction force acting through the supporting point. The dynamic equilibrium condition can merely describe the relationship, at instance, between the inertial force and gravity and the floor reaction force of a moving object.

It is a frequent misconception that continuous robot walking is ensured if the dynamic equilibrium condition is satisfied. However, satisfaction of the dynamic equilibrium condition does not mean the robot is at a stable posture. Likes the center of gravity of the inverted pendulum tends, if begins to move away, to move further away, the center of gravity of the robot tends, once begins to move away from the position immediately above the ZMP, to move farther away therefrom.

Reason 2) The one-leg supporting period requires that the ZMP must be within the supporting leg foot sole floor-contact area, etc. Due to rigid conditions of constraint such as this, it is difficult to determine the body acceleration and deceleration patterns. If the body patterns are determined mainly taking body position into account, the velocity would tend to be out of range, and vice versa.

As stated, it has hitherto been difficult to generate or determine the desired gait parameters or table data, on a real-time basis, which will satisfy all of the possible gait conditions. The aforesaid prior art techniques described in the references could not effect free gait generation.

Continuing the explanation of the gait, the gait is described by gait parameters. The gait parameters comprise motion parameters and the ZMP parameter (more generally floor reaction force parameter). The "floor reaction force parameter" is used in this specification to mean a parameter relating to the floor reaction force pattern with respect to time.

The ZMP trajectory is expressed by a broken-line pattern as will be explained with reference to FIG. 16 (referred to only in the X-coordinate in the figure) and is described or expressed with respect to the coordinate of X, Y and Z (directions) by the positions of the braking points and passing times of the pattern.

The motion parameters comprise foot (trajectory) parameters and the body (trajectory) parameters.

The foot trajectory parameters comprise initial free leg (foot lifting) position and posture, terminal free leg (foot landing) position and posture, and durations of the two-leg supporting period and the one-leg supporting period, etc. Based on these, instantaneous values of the positions (xf, yf, zf) and posture ($\theta xf$, $\theta yf$, $\theta zf$) of foot are determined in accordance with the techniques proposed earlier by the applicant in Japanese Laid-Open Patent Applications Hei 5 (1993)-318339 and Hei 5 (1993)-324115. Here, the word "posture" means inclination or direction in space.

The body trajectory parameters comprise parameters determining the body posture (the direction or inclination of the body 24 in space), parameters determining the body height (value in the Z-direction), parameters determining initial body position (displacement) and velocity, etc.

Based on the parameters determining the body position and posture, instantaneous values of the horizontal body position (xb, yb) and posture (θxb, θyb, θzb) of the body are determined in accordance with time functions or the technique proposed earlier by the applicant in Japanese Laid-Open Patent Application Hei 5 (1993)-324115. The height of body zb is determined using an appropriate technique such as that described in Japanese Laid-Open patent Application No. Hei 10 (1998)-86080 proposed by the applicant.

Since the robot 1 has 12 joints as illustrated in FIG. 1, desired joint displacements are solely deterministically calculated by an inverse kinematic solution from the obtained feet position and posture and the body position and posture, as will be explained later. More specifically, the desired robot posture at the current time is solely determined.

Aside from the above, since the generation of an ideal desired gait can not act against physical laws, a demanded state can not be reached immediately. The transition to the demanded state should be achieved slowly by changing gait parameters such as the ZMP trajectory, landing position and landing time, etc., within permissible ranges. In particular, assuming the dynamic system of the biped robot in this embodiment as a system that inputs the ZMP and outputs the body position, it is a divergence system. Unless the gait parameter change is conducted carefully, it becomes difficult to restore to a normal state.

Therefore, when generating a gait as desired on a real-time basis, it is preferable to predict robot's future behavior and to determine the gait parameters such that the robot's future behavior, e.g., a behavior at several walking steps from now does not diverge, and to correct the gait so as to avoid divergence if a possibility of occurrence of the divergence is predicted.

Figure 23:
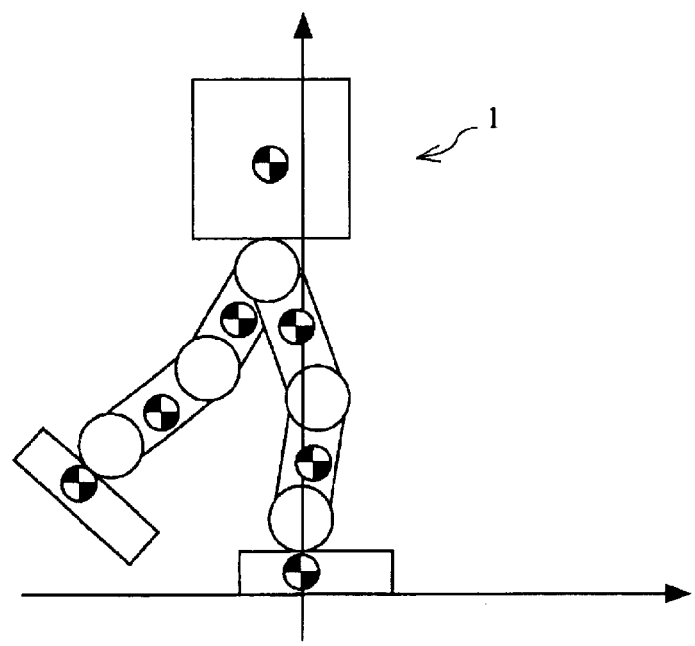
FIG. 23 is an explanatory view showing a biped robot of a legged mobile robot modeled with all links set with material points.

However, as discussed above, when the multiple-material-point model as shown in FIG. 23 is used, since the volume of calculation is large and the system is not linear, it is quite difficult for a usual on-board CPU (mounted on the robot, i.e., the first arithmetic unit 60) to determine the gait terminal state on a real-time basis. And as regards the future behavior prediction and divergence prevention technique based thereon might be realized to a certain level, by, for example, storing various kinds of knowledge and by selecting a desired gait at every gait switching in response to the state and objective at that time from the stored knowledge. In practice, however, a trial to cope with all possible condition would cause an explosion of combination, and this method would actually be impossible.

Figure 5:
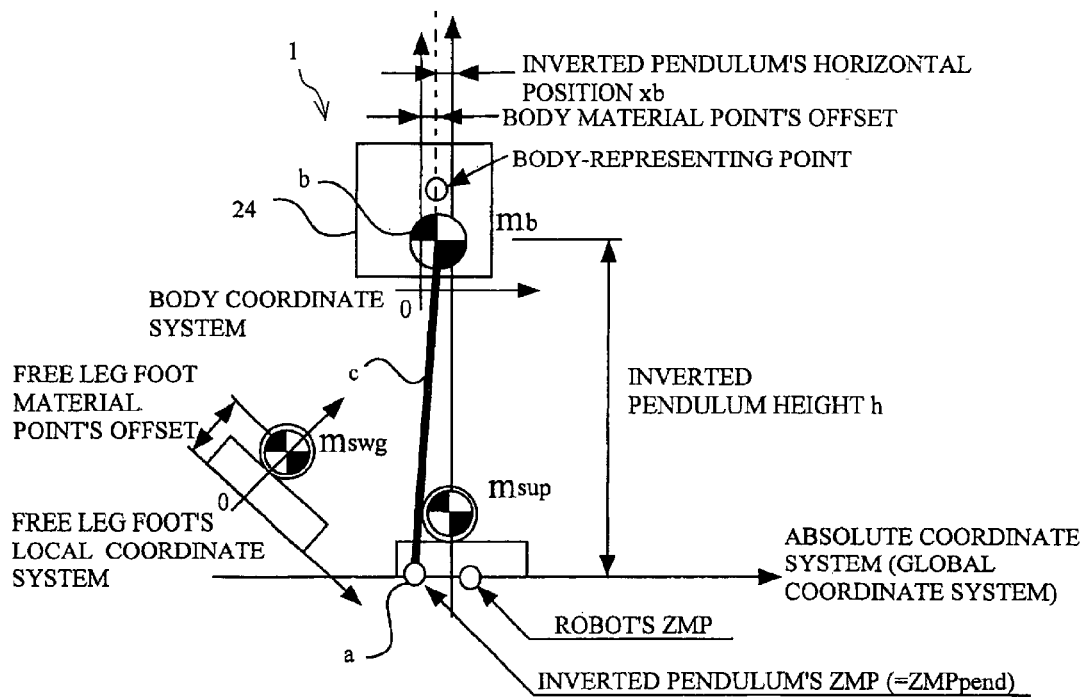
FIG. 5 is an explanatory view showing a dynamic model that approximates the legged mobile robot illustrated in FIG. 1 by an inverted pendulum to be used by a gait generator illustrated in the configuration shown by FIG. 4.
Figure 6:
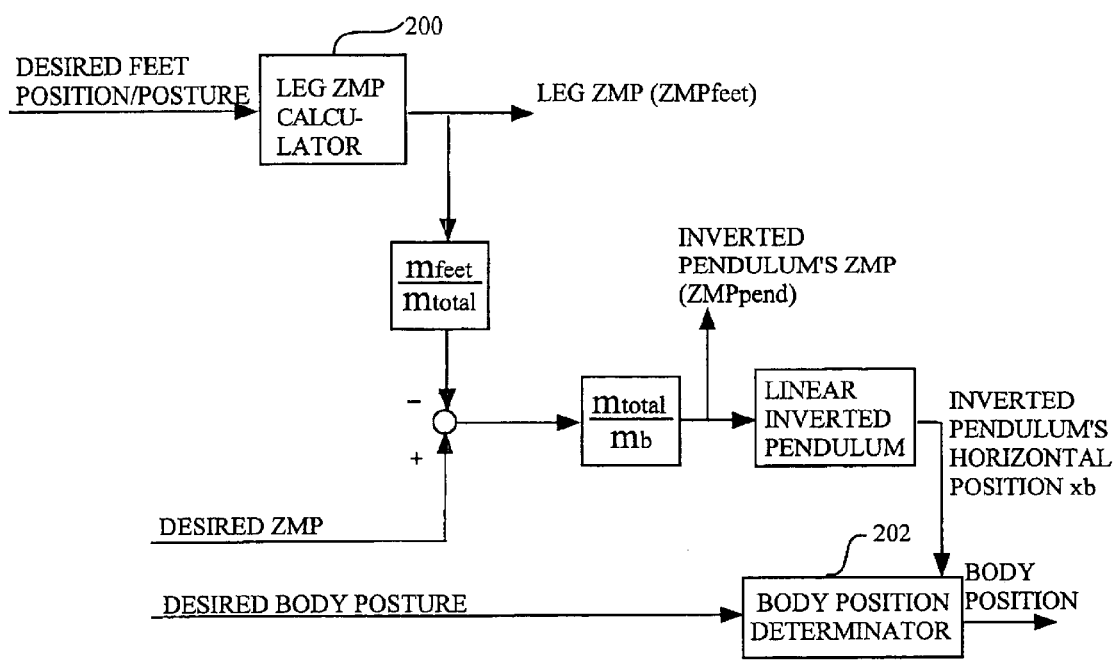
FIG. 6 is a block diagram showing dynamic calculation conducted by the gait generator with the use of the dynamic model illustrated in FIG. 5.

In view of the above, it is configured such that a dynamic model that describes the dynamic behavior of the robot 1 is simplified in such a way that future robot behavior can analytically be predicated in calculation on a real-time basis. FIG. 5 shows the simplified robot dynamic model. As illustrated, this dynamic model is three-material-point model and is decoupled, i.e., the dynamics of the leg and those of the body do not interfere with each other and the dynamics of the robot as a whole are expressed by their linear combination. FIG. 6 is a block diagram showing dynamic calculation (conducted at a dynamic calculator in the gait generator 100) using the dynamic model illustrated in FIG. 5.

The dynamic model will be explained.

1) This model comprises three material points made up of an inverted pendulum, a foot material point of the supporting leg and a foot material point of the free leg.

2) The supporting leg foot material point is set at a fixed point on a coordinate system set locally at the supporting leg foot. The coordinate system is a XYZ rectangular coordinate system in which the origin is defined on a sole of the foot, projected from the center of ankle onto the sole of the foot, the X-Y plane is equal to the sole and the X-axis is defined as the direction from the heel to toe. This coordinate system is hereinafter referred to as "supporting leg local coordinate system". A coordinate system on the fixed point on the supporting leg local coordinate system is hereinafter referred to as "supporting leg foot material point's offset".

Similarly, free leg foot material point is set at a fixed point on a coordinate system that is set at the free leg foot. This coordinate system is hereinafter referred to as "free leg local coordinate system". A coordinate system on the fixed point on the free leg local coordinate system is hereinafter referred to as "free leg foot material point's offset".

A coordinate system whose origin is defined on a foot point projected from the center of ankle onto the floor when the supporting leg foot is entirely in contact with the floor, and whose coordinate axes are fixed on the floor in such manner that the X-axis is defined as the front direction of the supporting leg foot, the Y-axis is defined in the left direction and the Z-axis is defined in the vertical direction, is hereinafter referred to as "supporting leg coordinate system" (that is different from the above-mentioned supporting leg local coordinate system. Unless it is mentioned to the contrary, the position, the velocity, the force, etc., are expressed by the supporting leg coordinate system.

3) The inverted pendulum comprises a supporting point a that is freely movable in the horizontal direction, a material point b and a link c that connects the supporting point and the material point. The link is expansible and has no mass. It is assumed here that the link expands, when tilting, such that the height of the mass viewed from the supporting point is kept constant. The inverted pendulum is the same as a linear inverted pendulum of a robot disclosed in the aforesaid publication (Hei 4 (1992)-15068).

The material point of the inverted pendulum corresponds to the material point of the body 24 in the sense of physics (the body's material point does not always indicate the center of gravity). Accordingly, the material point of the inverted pendulum is the same as the material point of the body. The position (more broadly, the displacement) of the inverted pendulum's material point is simply referred to as "inverted pendulum position".

4) The horizontal position of the body is geometrically determined from the inverted pendulum's horizontal position. Specifically, it is determined such that a horizontal position (X-Y coordinate system viewed from the supporting leg coordinate system) of the representative point (hereinafter referred to as "body-representing point") on a coordinate system locally set at the body (the coordinate is hereinafter referred to as "body coordinate system") becomes equal to the inverted pendulum's horizontal position. More specifically, the body-representing point and the inverted pendulum's material point b are determined such that they are on the same vertical line, as illustrated in FIG. 5. A horizontal coordinate of the body-representing point on the body coordinate system is referred to as "body material point's offset".

The description of variables and parameters relating to the illustrated dynamic calculation model will then be explained.

For ease of explanation, variables and parameters relating to the dynamic calculation model are defined and described as follows:

The ZMP of the inverted pendulum shall be present at the supporting point a since the ZMP is defined as a point at which no moment is generated and the supporting point is free and hence no moment is generated there. Accordingly, since the inverted pendulum's supporting point can be regarded as the ZMP of the pendulum itself, it is referred to as "inverted pendulum's ZMP" and is, on and after, described or expressed as "ZMPpend".

Mass and position of the individual material points are described as follows:

msup: supporting leg's material point mass
mswg: free leg's material point mass
mb: inverted pendulum's material point mass (body's material point mass)
mtotal: robot mass (=mb+msup+mswg)
mfeet: feet mass (=msup+mswg)
xsup: supporting leg's material point position
xswg: free leg's material point position
xb: inverted pendulum's position (body's material point position)

On and after, xb is expressed by three-dimensional vector (XYZ coordinate system vector), if not mentioned to the contrary. The height of the inverted pendulum indicates the height from the supporting point to the material point and is described as h.

$d(xb)/dt$ is the first order differential of xb and indicates the velocity of the inverted pendulum, whereas $d2(xb)/dt2$ is the second order differential of xb and indicates the acceleration of the inverted pendulum. The value g is a constant of the acceleration of gravity. G is a vector of the acceleration of gravity and is defined as a vector whose X, Y components are 0 and Z component is—g.

In the illustrated three-material-point model, moment of total inertial force of the leg material point acting about a point of action P is defined as "leg's total inertial force moment about point P". Here, the resultant force of the inertial force and gravity is hereinafter referred to "total inertial force". The coordinate (or position) of the point of action P is described as xp.

Eq. 1, mentioned below, is an equation strictly defining, in terms of dynamics, of the leg's total inertial force moment about P $$\text{leg's total inertial force moment about } P = msup(xsup-xp)*G - msup(xsup-xp)*d2(xsup)/dt2 + mswg(xswg-xp)*G - mswg(xswg-xp)*d2(xswg)/dt2 \quad \text{Eq. 1}$$

The leg ZMP is described as ZMPfeet and is defined by Eq. 2. The height of the leg ZMP (i.e., the Z component of ZMPfeet) is set to the same value as the height of the point P. Thus, the leg ZMP is a pseudo value to be corresponding to the resultant force (total inertial force) generated by the leg motion.

$$\text{leg's total inertial force moment about } P = mfeet*(ZMPfeet-xp)*G \quad \text{Eq. 2}$$

Inherently, the dynamics of the robot 1 illustrated in FIG. 1 is non-linear. Therefore, by approximation, the relationship defined by Eq. 3 is given between the desired ZMP, the leg ZMP (ZMPfeet) and the inverted pendulum's ZMP (ZMPpend).

$$ZMPpend = mtotal/mb * \text{desired } ZMP - mfeet/mb * ZMPfeet \quad \text{Eq. 3}$$

Generally, the differential equation describing the behavior of a linear inverted pendulum is expressed by Eq. 4.

$$d2(xb)/dt2\text{'s horizontal component} = g/h*(xb\text{'s horizontal component} - ZMPpend\text{'s horizontal component}) \quad \text{Eq. 4}$$

Figure 7:
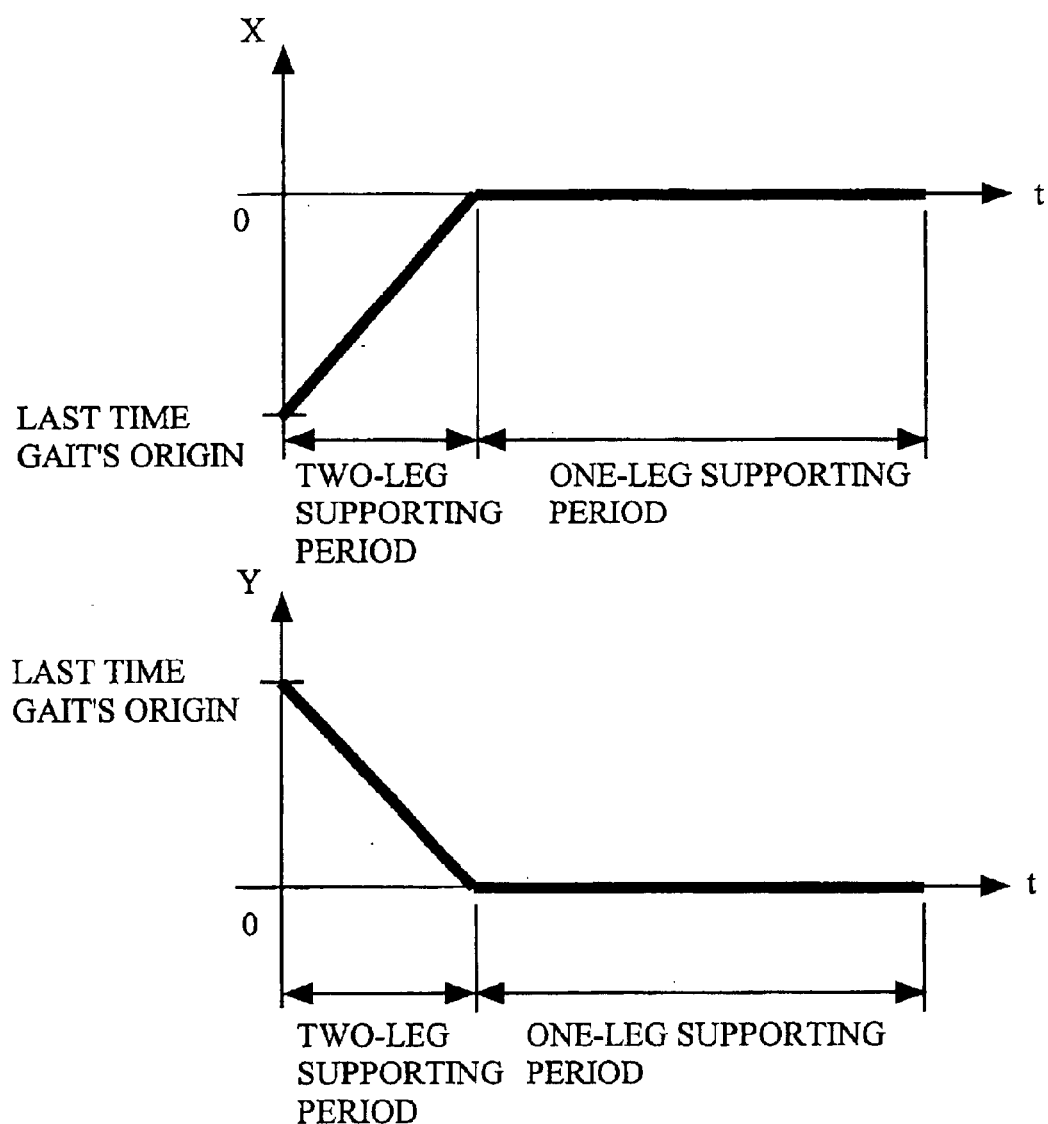
FIG. 7 is a set of time charts showing a trajectory of a point of action P of the resultant force of the inertial force and gravity of the leg's material point, to be used in calculating a pseudo ZMP value ZMPpend indicative of the supporting point of the inverted pendulum of the dynamic model illustrated in FIG. 5.

Here, the point of action P is set to improve the accuracy of model approximation. For example, as illustrated in a time chart of FIG. 7, the point of action P is set in such a manner that it moves, at the same speed during the two-leg supporting period, from the origin of the supporting leg coordinate system of gait immediately before (last time gait) to that of the current time gait.

The dynamic model proposed in the gait generation system of legged mobile robot according to the embodiment, is expressed by the offsets describing the relationship between the foot, the body and the material points illustrated in FIG. 5 and the equations (Eqs. 1 to 4). This configuration makes it easy to predict future behavior, as will be explained later.

Explaining the operation of the dynamic calculator of the gait generator 100 (illustrated in FIG. 1) with reference to FIG. 6, it has a leg ZMP calculator 200. The calculator 200 calculates the leg ZMP (ZMPfeet) based on Eqs. 1 and 2 and on the point of action P illustrated in FIG. 7.

Then, it calculates the inverted pendulum's ZMP (ZMPpend) by multiplying the calculated ZMPfeet by mfeet/mtotal, by subtracting the product from the desired ZMP, and by multiplying the difference by mtotal/mb. In other words, the inverted pendulum's ZMP is determined or calculated by subtracting the product obtained by multiplying ZMPfeet (corresponding to or indicative of the leg ZMP) by a ratio between the leg's mass mfeet and the body material point's mass mb from the product obtained by multiplying the desired ZMP by a ratio of the robot mass mtotal and the body material point's mass mb. This processing corresponds to the processing of Eq. 3.

The behavior of the inverted pendulum is expressed by Eq. 4. The inverted pendulum material point's horizontal position xb is determined or calculated.

Further, as illustrated in FIG. 6, the dynamic calculator has a body position determinator 202 which determines the horizontal body position xb. Specifically, the determinator 202 determines the horizontal body position in such a way that the horizontal position of the body-representing point (illustrated in FIG. 5) is equal to the horizontal position of the inverted pendulum.

Next, the gait for maintaining posture stability continuously will be explained.

Figure 8:
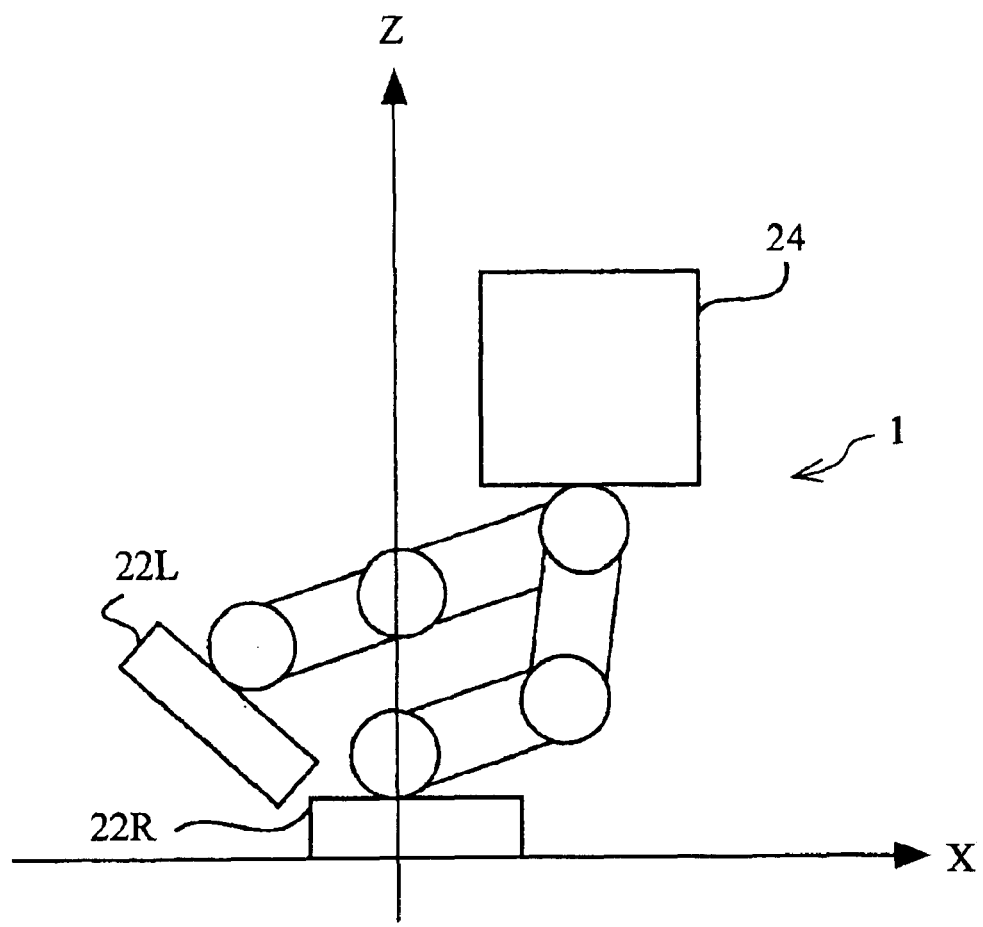
FIG. 8 is an explanatory view showing a situation where a trajectory of the body of the robot illustrated in FIG. 1 diverges.

The dynamic model itself does merely calculate the body trajectory from the desired ZMP in such a manner that the dynamic equilibrium condition at each instant is approximately satisfied. It can not prevent the body trajectory from diverging, it can not avoid the position of the body 24 from deviating from a position corresponding to the positions of the feet 22R(L), as illustrated in FIG. 8.

It will then be discussed how the relationship between the body and the feet is appropriately retained so as to avoid divergence.

For ease of understanding, the nature of the linear inverted pendulum that is especially significant for obtaining future body trajectory analytically will first be discussed. The explanation will be made with the use of a discrete-time-series model.

Variables and parameters will be additionally defined for the inverted pendulum as follows:

ω0: natural angular frequency of inverted pendulum
ω0=sqrt (g/h) (here, sqrt indicate square root)

Δt: sample time x[k]: inverted pendulum's position at k-th step (time kΔt)

v[k]: inverted pendulum's velocity at k-th step (time kΔt)

ZMPpend[k]: inverted pendulum's ZMP at k-th step (more precisely, it is assured that a signal obtained by 0-order holding the ZMPpend[k] is and is kept inputted from time kΔt to time (k+1)Δt. More specifically, it is assumed that the same signal is kept inputted to the inverted pendulum during that time of period)

Further, values q[k] and p[k] are defined by Eq. 5 as follows:

$$q[k]=x[k]+v[k]/\omega 0$$

$$p[k]=x[k]-v[k]/\omega 0 \quad \text{Eq. 5}$$

By discretizing the equation of motion of the inverted pendulum and by solving with respect to q[k] and p[k], we obtain Eqs. 6 and 7. In the equations, "exp" indicates an exponential function (natural logarithm).

$$p[k] = \exp(-\omega 0 k \Delta t) * \left( p[0] + (\exp(\omega 0 \Delta t) - 1) \sum_{i=0}^{k-1} (\exp(i\omega 0 \Delta t) * ZMPpend[i]) \right) \quad \text{Eq. 6}$$

$$q[k] = \exp(\omega 0 k \Delta t) * \left( q[0] + (\exp(-\omega 0 \Delta t) - 1) \sum_{i=0}^{k-1} (\exp(-i\omega 0 \Delta t) * ZMPpend[i]) \right) \quad \text{Eq. 7}$$

The meaning of the equations will be discussed.

Assume that ZMPpend[i] is set to satisfy following Eq. 8 with respect to certain definite constants ZMPmin and ZMPmax.

$$ZMPmin \leq ZMPpend[i] \leq ZMPmax \quad \text{Eq. 8}$$

By substituting the relationship between the middle term and the right term of Eq. 8 into Eq. 6, we obtain following Eq. 9.

$$p[k] \leq \exp(-\omega 0 k \Delta t) * \left( p[0] + (\exp(\omega 0 \Delta t) - 1) \sum_{i=0}^{k-1} (\exp(i\omega 0 \Delta t) * ZMPmax) \right) \quad \text{Eq. 9}$$

From the theorem of sum of geometric series, we obtain Eq. 10.

$$\sum_{i=0}^{k-1} \exp(i\omega 0 \Delta t) = (1 - \exp(k\omega 0 \Delta t))/(1 - \exp(\omega 0 \Delta t)) \quad \text{Eq. 10}$$

Accordingly, Eq. 9 can be rewritten as Eq. 11.

$$p[k] \leq \exp(-\omega 0 k \Delta t)*p[0]+(1-\exp(-\omega 0 k \Delta t))*ZMPmax \quad \text{Eq. 11}$$

Similarly, from the relationship between the left term and the middle term of Eq. 8 into Eq. 6, we obtain Eq. 12.

$$p[k] \geq \exp(-\omega 0 k \Delta t)*p[0]+(1-\exp(-\omega 0 k \Delta t))*ZMPmin \quad \text{Eq. 12}$$

Since exp(−ω0kΔt) converges (gradually approaches) to 0 when k becomes infinity, Eqs. 11 and 12 show p[k] does not diverge and fall between ZMPmax and ZMPmin in due course, even if ZMPpend fluctuates.

Further, as a specific example, let us discuss a case that ZMPpend becomes a constant value ZMP0 after lapse of a certain time. In that case, defining the time as time 0, Eq. 6 can be rewritten as Eq. 13. This indicates that p[k], irrespectively of its initial value, converges to ZMP0 in a geometric series manner.

$$p[k]=\exp(-\omega 0 k \Delta t)*(p[0]-ZMP0)+ZMP0 \quad \text{Eq. 13}$$

More generally, it indicates that p[k], no matter what value it was at a certain time point, converges to a certain trajectory (that follows waveform of the ZMPpend) if the ZMPpend waveform is a same waveform.

On the other hand, q[k] tends to diverge as will be understood from Eq. 7.

As a specific example, let us again discuss the case that ZMPpend becomes a constant value ZMP0 after lapse of a certain time. Defining the time as time 0, Eq. 7 can be rewritten as Eq. 14. This indicates that q[k] diverges to ZMP0 in a geometric series manner, if q[0] is ZMP0.

$$q[k]=\exp(\omega 0 k \Delta t)*(q[0]-ZMP0)+ZMP0 \quad \text{Eq. 14}$$

Hereinafter, p[k] defined by Eq. 5 is referred to as "convergent component" and q[k] similarly defined by Eq. 5 is referred to as "divergent component".

From the above, it can be said that, in order to avoid divergence of the body trajectory and to retain an appropriate positional relationship between the body and feet, the convergent component can be neglected in practice, and what is significant is that to control the divergent component (viewed from the supporting leg) within a range that ensures robot walking.

More specifically, it can be said that it is important to determine the ZMP trajectory parameters and other parameters appropriately such that the divergent component does not exceed the range that ensures robot walking (i.e., the range that prevents posture from deviating markedly). Unless the body behavior is made linear in the present invention, it was impossible in the prior art to build equations where the divergent component and the convergent component are separated like Eqs. 6 and 7. Thus, it was not possible to make these discussions in the prior art. Now, it becomes possible in this embodiment.

The nature of the convergent component and divergent component will be explained.

Nature 1: Symmetry

The differences between the equations for obtaining the convergent component p[k] and the divergent component q[k] is that p[k] is replaced with q[k] and that ω0 is replaced with −ω0.

Nature 2: Equivalent Conversion

Since they are symmetric, the divergent component will only be discussed.

Supposing as an input a pulse expressed by ZMPpend[0]=U0 and ZMPpend[i]=0 (i=1,2, . . . ), q[k] at that case is obtained by substituting this ZMPpend[i] into Eq. 7, as will be shown in Eq. 15.

$$q[k]=\exp(\omega 0 k \Delta t)(q[0]+(\exp(-\omega 0 \Delta t)-1)U0) \quad \text{Eq. 15}$$

From this, considering the influence only upon the divergent component q[k], to input the initial pulse U0 will bring the same influence obtained by shifting the initial divergent component by U0*(exp(−ω0Δt)−1). In other words, the initial pulse is equivalently converted into the initial divergent component by multiplying by (exp(−ω0Δt)−1).

Further, considering the influence only upon the divergent component q[k] by comparing Eqs. 7 and 15 with each other, influence caused by inputting ZMPpend[i] (i=0,1,2, ... k−1) will bring the same influence as that obtained by the initial pulse input U0 defined in Eq. 16.

$$U0 = \sum_{i=0}^{k-1} (\exp(-\omega 0 i \Delta t) * ZMPpend[i])$$ Eq. 16

Thus, the input ZMPpend[i] (i=0, 1, 2, ... k−1) is equivalently converted into the initial pulse input Nature 3: Influence by Time Delay As illustrated in FIG. 9, assuming that ZMPpend[i] is a function f(i), and that ZMPpend'[i] is a function f(i−nΔt) which is obtained by delaying the function f(i) by a time nΔt, and defining conversion of the input series ZMPpend[i] into the initial pulse as U0 and conversion of the input series ZMPpend'[i] into the initial pulse as U0', U0' will be expressed as Eq. 17.

$$U0'=U0*\exp(-n\omega 0 \Delta t)$$ Eq. 17

In other words, the same waveform is inputted by delaying by the time nΔt, the divergent component induced by the input is a value multiplied by exp(−nω0Δt).

Then, a divergent component obtained by inputting complicated waveform of the inverted pendulum's ZMP into the inverted pendulum model illustrated in FIG. 5.

The ZMP input given to the inverted pendulum of the dynamic model illustrated in FIG. 5 (or Eq. 3) is a difference between the product of the desired ZMP and mtotal/mb, and the product of the leg ZMP and mfeet/mb. Since the desired ZMP is specifically expressed by a waveform of broken line, the product of the desired ZMP and mtotal/mb is similarly expressed by a waveform of broken line.

Therefore, principle and algorithm to analytically determine the divergent component induced by inputting the ZMP of broken-line waveform to the inverted pendulum will be explained. (The influence of the leg ZMP will be described later.) Actually, the inverted pendulum's ZMP moves on a two-dimensional space (horizontal plane). However, for ease of understanding, it is assumed that the ZMP moves along a linear space.

Figure 10:
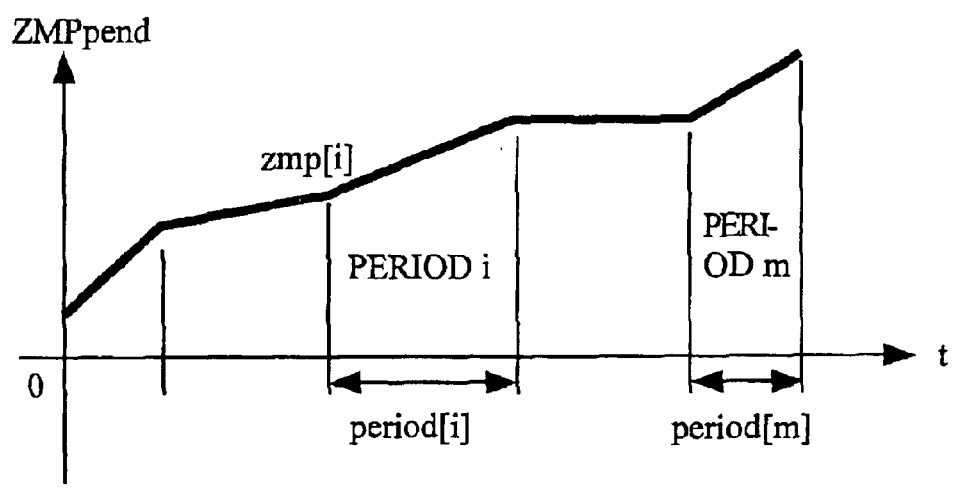
FIG. 10 is a time chart similarly showing a trajectory of the pseudo ZMP value ZMPpend, in waveform, indicative of the supporting point of the inverted pendulum of the dynamic model illustrated in FIG. 5.

Let us suppose a broken-line as illustrated in FIG. 10 as the waveform of the inverted pendulum's ZMP. Period i is defined as a period of time whose length is period[i] and the initial value is ZMP[i]. The principle and algorithm to obtain the divergent component generated by this ZMP will now be explained.

Let us define a value as H(f(t), T) which is obtained by converting a divergent component (generated by continuously inputting x=f(t) over the period of time [0,T] to the inverted pendulum model as the input of the inverted pendulum's ZMP), into magnitude of pulse inputted at time 0 and time width is a sample time Δt.

From Eq. 6, H(f(t), T) is expressed by product-sum calculation shown in Eq. 18. In the equation, ω indicates the natural angular frequency of the inverted pendulum).

$$H(f(t), T) = \sum_{k=0}^{T/\Delta t - 1} (k \Delta t) \exp(-\omega k \Delta t)$$ Eq. 18

Figure 11:
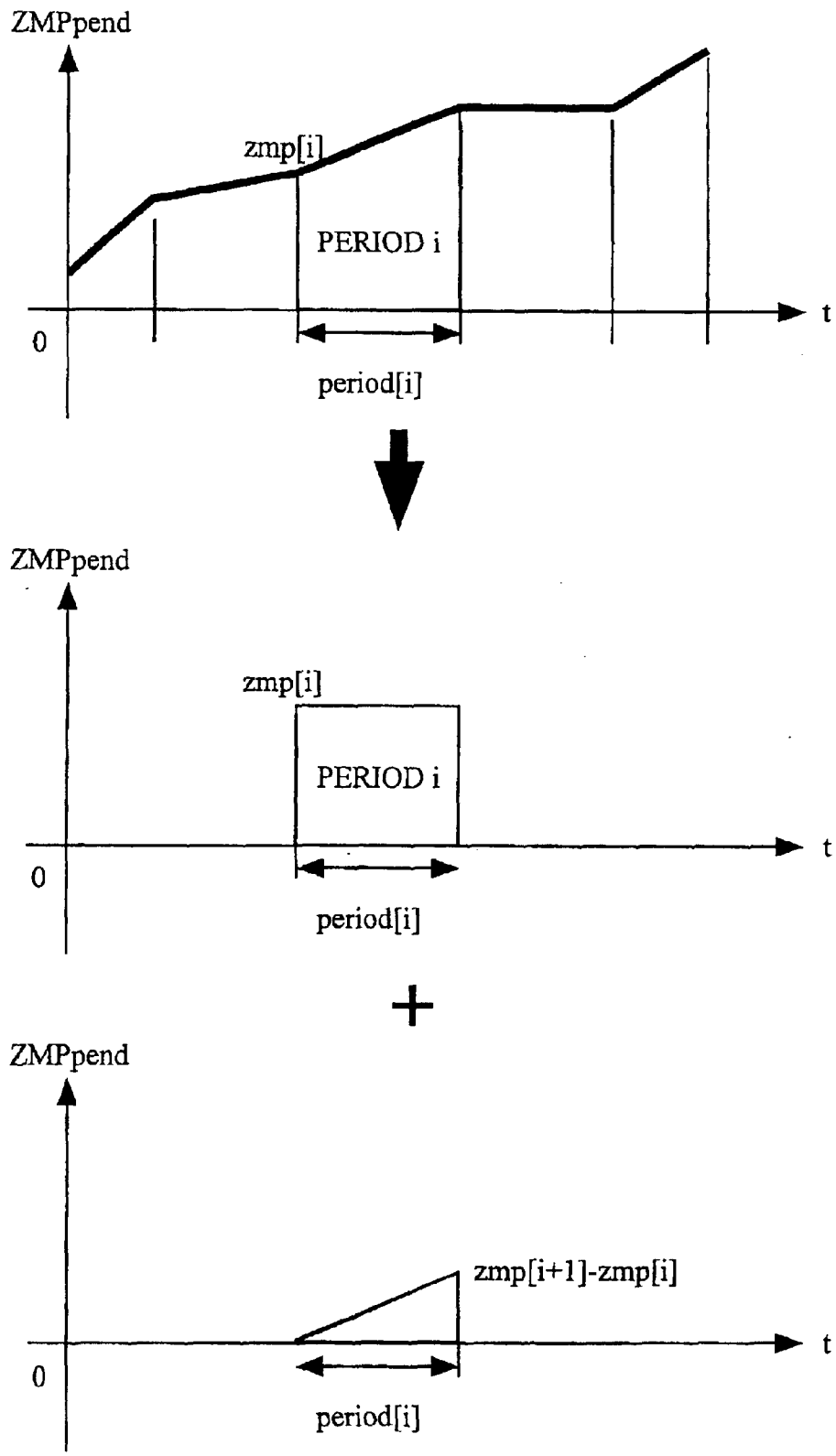
FIG. 11 is a set of time charts showing resolved parts of the waveform of the pseudo ZMP value ZMPpend illustrated in FIG. 10.

The inverted pendulum's ZMP's waveform in the period i can be dissolved into a step-like waveform and a ramp-like waveform each having a delay, as illustrated in FIG. 11. Accordingly, H(f(t), T) for the step-like and ramp-like waveforms should be determined beforehand in a manner mentioned below.

Specifically, describing H(f(t), T) of a step-like waveform of x=f(t)=1 as H(1, T), it will be expressed as shown in Eq. 19, using the theorem of sum of geometric series.

$$H(1,T)=(1-\exp(-\omega t))/(1-\exp(-\omega \Delta t))$$ Eq. 19

Describing H(f(t), T) of a ramp-like waveform of x=f(t)=t as H(t, T), it will be expressed as shown in Eq. 20.

$$H(t,T)/T=(\Delta t/T*\exp(-\omega \Delta t)H(1,T)-\exp(-\omega t))/(1-\exp(-\omega \Delta t))$$ Eq. 20

It should be noted that if the ZMP waveform is other than the form of broken-line, other function f will be needed. There could sometime be no analytic solution of F(f(t), T) for the other function f. In that case, it will be sufficient if the function f is normalized and H(f(t), T) is then changed to a table data. The value F(f(t), T) in the above may also be changed to a table data.

Having conducting these preparatory processing, a value (hereinafter referred to as "W"), which is obtained by converting a divergent component (generated by the inverted pendulum's ZMP illustrated in FIG. 10), into magnitude of inverted pendulum's ZMP pulse inputted at time 0 and the time width is a sample time Δt.

First, influence of the inverted pendulum's ZMP during the period i (i=0, 1, ... 5) should be converted into the magnitude of a pulse inf[i] inputted at the initial time of the period i and its time width is the sample time Δt. As illustrated in FIG. 11, the waveform of the inverted pendulum's ZMP during the period i is expressed by the sum of a rectangular waveform whose height is ZMP[i] and whose slope is (ZMP[i+1]−ZMP[i])/period[i], the pulse conversion value will be as shown by Eq. 21.

$$inf[i]=H(1, period[i])*ZMP[i]+H(t, period[i])/period[i]*(ZMP[i+1]-ZMP[i])$$ Eq. 21

Then, influence of the inverted pendulum's ZMP during the period [i](i=0, 1, ... m) should be converted into the magnitude of a pulse inf'[i] inputted at the initial time of the period i and its time width is the sample time Δt. From nature 3, the pulse conversion value will be as shown by Eq. 22.

$$inf'[i] = inf[i] * \exp\left(-\omega 0 \left(\sum_{k=0}^{i-1} period\ [k]\right)\right)$$ Eq. 22

Influence of the inverted pendulum's ZMP waveform during all of the periods illustrated in FIG. 10, will be the sum of the influence of the individual periods. In other words, the pulse conversion value W is calculated as shown in Eq. 23.

$$W = \sum_{i=0}^{m} inf'[i]$$ Eq. 23

From nature 2, when equivalently converting W into an initial divergent component, it will be as shown in Eq. 24.

$$W*(\exp(-\omega 0 \Delta t)-1)$$ Eq. 24

From Eq. 24 or nature 3, when equivalently converting W into the divergent component at gait terminal, it will be as shown in Eq. 25.

$$W * (\exp(-\omega 0 \Delta t) - 1) * \exp\left(\omega 0 \left(\sum_{i=0}^{m} \text{period } [i]\right)\right) \quad \text{Eq. 25}$$

Following the procedures mentioned above, it becomes possible to analytically obtain the divergent component at gait terminal induced by the inverted pendulum's ZMP expressed by a broken-like like waveform.

Then the gait generation algorithm that ensures continuous walking will be explained.

As mentioned above, in order to avoid divergence of the body trajectory and to retain an appropriate positional relationship between the body and feet, it is important to determine the ZMP trajectory parameters and other parameters appropriately such that the divergent component does not exceed the range that ensures robot walking (i.e., the range that prevents posture from deviating markedly).

Next problem is therefore how to determine the range that ensures robot walking or an appropriate value of the divergent value.

The gait generator 100 according to the embodiment determines an appropriate value of the divergent component by provisionally determining or setting a gait that is to be continuous to a current time gait now being generated. The gait that is to be continuous to the current time gait is hereinafter referred to as "steady turning gait" and will be explained later.

The operation of the gait generator 100 will be explained in detail.

The gait generator inputs demand (demand value) concerning free leg foot's landing position and posture and landing time for next two walking steps, and determines the desired body position and posture trajectory, the desired foot position and posture trajectory and the desired ZMP trajectory. At this time, the gait parameters are partially corrected so as to ensure continuous walking. Hereinafter, the gaits being generated is referred to as "current time gait", a gait succeeding thereto is referred to as "next time gait" and a gait further succeeding thereto is referred to as "next but one time gait".

Figure 12:
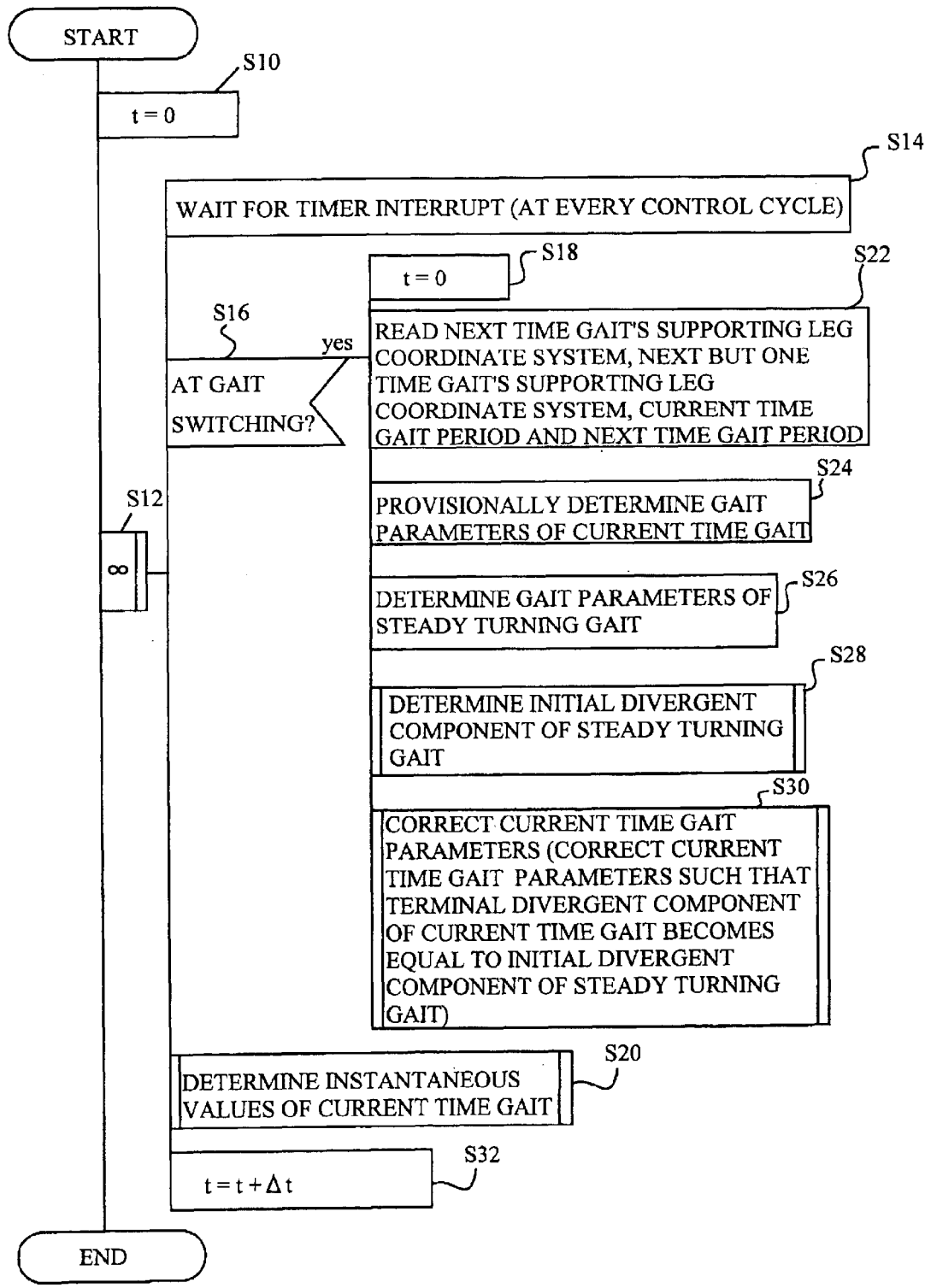
FIG. 12 is a flow chart showing the operation of the gait generation system of a legged mobile robot illustrated in FIG. 1.

FIG. 12 is a flow chart (structuralized flow chart) showing the gait generation of the gait generator 100.

The program begins at S10 in which various kinds of initialization processing including initializing a time t to 0 are conducted. The program then proceeds, via S12, to S14 in which timer interrupt at every control cycle is waited for. The control cycle (period) is $\Delta t$. The program then proceeds to S16 in which it is determined whether the gait is at the time of switching. When the result is affirmative, the program proceeds to S18, whilst when the result is negative, the program proceeds to S20.

When the program proceeds to S18, the time t is again initialized to 0. The program then proceeds to S22 in which a next time gait's supporting leg coordinate system, a next but one time gait's supporting leg coordinate system and a current time gait period and a next time gait period are read. There values are corresponding to the aforesaid demand. They may be stored in the memory as a walking schedule or may be determined based on an instruction inputted from the joystick 44 or other operator apparatus and the history of walking up to that time.

The program then proceeds to S24 in which gait parameters of the current time gait are provisionally determined.

As regards the parameters, the current time gait's initial free leg position and posture are determined to be the current free leg foot position and posture viewed from the current time gait's supporting leg coordinate system (as the initial values). The current time gait's initial supporting leg foot position and posture are determined to be the current supporting leg foot position and posture viewed from the current time gait's supporting leg coordinate system (as the initial values). The current time gait's terminal free leg foot position and postures are determined in response to the next time gait's supporting leg coordinate system viewed from the current time gait's supporting leg coordinate system. Specifically, they are determined in such a way that the foot position and posture of the free leg foot (obtained when rotated horizontally, without slippage, from terminal position and posture in the current gait, while keeping contact with the floor) will shift to the next gait's supporting leg coordinate system.

The current time gait's terminal supporting leg foot position and posture are determined to position and posture where the foot is in surface contact with the floor so as not to slip (those are obtained by being rotated from the current supporting position and posture). As a result, if the floor is flat, the current time gait's terminal supporting leg foot position and posture are equal to the current time gait's supporting leg coordinate system. In the gait mentioned here, although the supporting leg foot is made horizontal at the gait terminal, the foot may take other position and posture.

The ZMP trajectory parameters of the current gait should be determined such that they are high in the margin of stability and do not change abruptly. The phrase "high in the margin of stability" indicates a condition where ZMP is present at the center or thereabout in a minimum convex polygon (the so-called supporting polygon and is described in detail in Japanese Laid-Open Patent Application Hei 10 (1998)-86081). The determination of current time gait's ZMP trajectory parameters is provisional and they are subject to correction as will be explained later.

The program then proceeds to S26 in which gait parameters of the steady turning gait that is to be continuous to the current time gait is determined. It should be noted that the "steady turning gait" indicates a periodic gait that does not bring about discontinuity in motion at gait boundary when repeated.

Basically, the steady turning gait comprises the first turning gait and the second turning gait. The reason why the term "turning" is used is that, when the rate of turning is set to zero, since this indicates a straight advance, the term makes it possible to include "straight advance" in "turning" in a broad sense. The steady turning gait is generated by the gait generator 100 temporarily or tentatively in order to determine the divergent component at the current gait terminal. Therefore, the steady turning gait is not outputted from the gait generator 100.

Incidentally, when following the aforesaid definition that the gait comprises one walking step that starts at the beginning of a two-leg supporting period and ends at the end of the one-leg supporting period succeeding thereto, the steady turning gait needs gaits for two walking steps. Although it is possible to set the steady turning gait of a complicated form having a set of gaits for three walking steps or more, such a complicated gait setting is tedious and the advantages and effects are less than expected since the steady turning gait is only used for determining the divergent component at the terminal of the current time gait. If the legged mobile robot has three legs or more, the number of gaits to define the turning will be increased in response thereto.

In the gait setting, boundary conditions of the leg trajectory in the gait parameters of the first turning gait and the second turning gait are set or determined such that the leg trajectory is made continuous in the order of the current time gait, the first turning gait and the second turning gait. Specifically, the initial free leg foot position and posture of the first turning gait is set to be the terminal supporting leg foot position and posture of the current time gait viewed from the next time gait's coordinate system. The initial supporting leg position and posture of the first turning gait is set to be the current time gait's terminal free leg position and posture viewed from the next time gait's supporting leg coordinate system.

The terminal free leg foot position and posture of the first turning gait is, similarly to the determination of the current time gait's terminal free leg position and posture, set or determined in response to the next but one's time gait's supporting leg coordinate system viewed from the next time gait's supporting leg coordinate system. The terminal supporting leg position and posture of the first turning gait is foot position and posture obtained by rotating, while keeping floor contact, the foot (set to the next time gait's supporting leg coordinate system) to be brought in surface contact with the floor so as not to slip. Therefore, if the floor surface is flat, the terminal supporting leg position and posture of the first turning gait become equal to those in the next time gait's supporting leg coordinate system.

The terminal free leg foot position and posture of the second turning gait are set or determined to be the same as the terminal free leg foot position and posture of the current gait viewed from the current time gait's supporting leg coordinate system. The terminal supporting leg position and posture of the second turning gait are set or determined to be same as those of the supporting leg foot position and posture of the current time gait viewed from the current time gait's supporting leg coordinate system.

Figure 13:
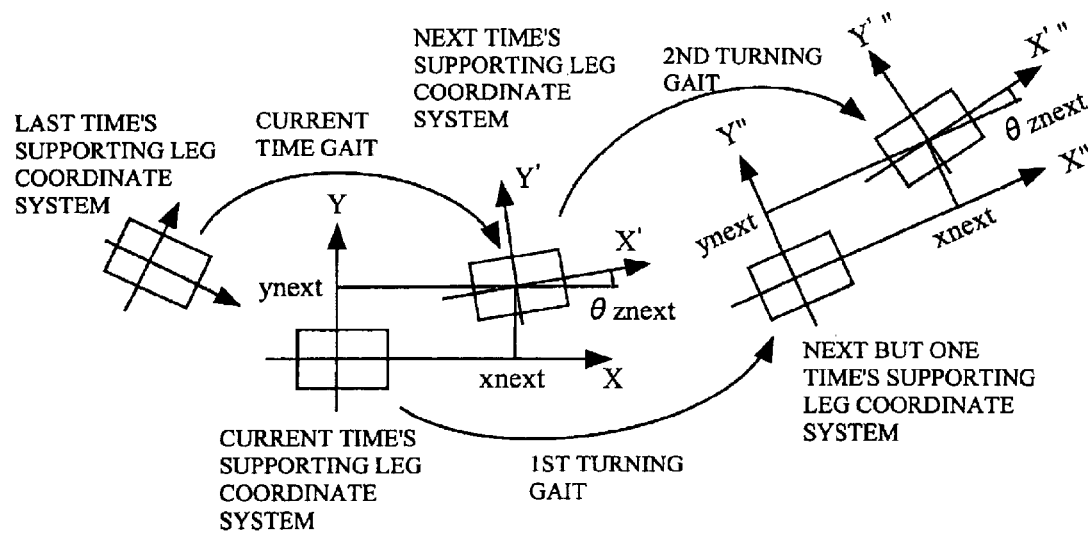

FIG. 13 illustrates relationships among these gait parameters.

The first turning gait and the second turning gait have the same walking period as that of the next time gait. (The waling period should necessarily be determined to be the same value, but should preferably be determined in response to the next time gait walking period.) Other motion parameters of the current time gait, the first turning gait and the second turning gait (including time parameters such as two-leg supporting period's length) should be determined appropriately in response to the determined parameters mentioned above in such a way that they satisfy the conditions of gait (e.g., the velocity of the electric motors (actuators) are within permissible ranges.)

The ZMP trajectory parameters of the first turning gait and the second turning gait should be set or determined such that they have high margin of stability and do not change abruptly.

Aside from the above, if initial position and velocity of the body-representing position are set to values X0, V0, after having generated the aforesaid first turning gait and the second turning gait with the use of the simple model illustrated in FIG. 5, the initial position and velocity of the body-representing position when the first turning gait generation is again started, become equal to the set values X0, V0. The values X0, V0 are hereinafter referred to as "body-representing point's initial position/velocity of the steady turning gait". The value X0 should be described as "(x0, y0)", but the description of V0 should be omitted.

With this, when the first turning gait and the second turning gait are generated repeatedly using the simple model illustrated in FIG. 5, the body-representing point's initial position and velocity of the first turning gait are equal to the values X0, V0, unless there are accumulated calculation errors. In other words, the continuity of walking can be ensured. Divergent component at this time, i.e., $X0+V0/\omega 0$ is hereinafter referred to as "steady turning gait's initial divergent component".

Returning the explanation of FIG. 12, the program then proceeds to S28 in which this steady turning gait's initial divergent component is determined.

Figure 15:
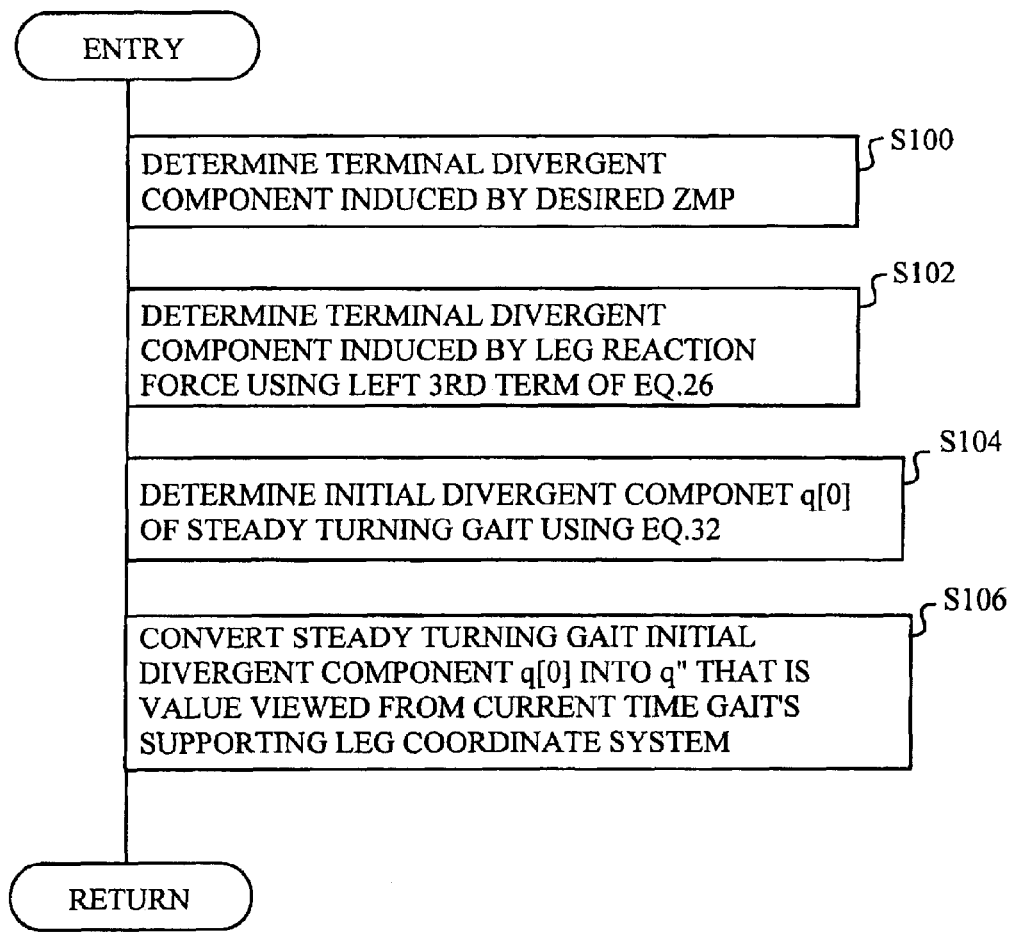
FIG. 15 is a subroutine flow chart showing the calculation of an initial divergent component of the steady turning gait referred to in the flow chart of FIG. 12.

FIG. 15 is a flow chart showing the steady turning gait's initial divergent component at S28 of the flow chart of FIG. 12.

Before entering the explanation of the figure, a principle for determining or calculating the steady turning gait's initial divergent component will be mentioned.

From Eqs. 3 and 7, it becomes possible to obtain following equation (Eq. 26): In the equation, the desired ZMP is described as ZMPtotal.

$$q[k] = \exp(\omega 0 k \Delta t) * q[0] + \exp(\omega 0 k \Delta t) * (-\exp(\omega 0 \Delta t) - 1) \quad \text{Eq. 26}$$

$$\sum_{i=0}^{k-1} (\exp(-\omega 0 \Delta t) * mtotal/mb * ZMPtotal[i]) -$$

$$\exp(\omega 0 k \Delta t) * (-\exp(\omega 0 \Delta t) - 1)$$

$$\sum_{i=0}^{k-1} (\exp(-i\omega 0 \Delta t) * mfeet/mb * ZMPfeet[i])$$

Actually, every gait is expressed by the supporting leg coordinate system of that gait. However, for ease of explanation, it is supposed that the first turning gait and the second turning gait are expressed by the first turning gait's supporting leg coordinate system and that a combination of the first turning gait and the second turning gait constitutes a single gait (steady turning gait).

Determination of a divergent component q[k] at the terminal of the steady turning gait by using Eq. 26 will then be explained. This divergent component is hereinafter referred to as "terminal divergent component". The initial time of the steady turning gait is assumed to be time 0. The terminal time of the steady turning gait is assumed to be time $k\Delta t$. This terminal time is corresponding to the time 0 of the next time gait.

In this equation, the right first term indicates the terminal divergent component induced by the initial divergent component. The right second term indicates the terminal divergent component induced by the desired ZMP pattern. The right third term indicates the terminal divergent component induced by the leg motion.

Since the desired ZMP pattern is expressed in the form of broken-line, the terminal divergent component induced by the desired ZMP pattern is determined analytically using the algorithm described by Eqs. 19, 20, 21, 22, 23 and 25 that determine the terminal divergent component induced by the aforesaid broken-line-like ZMPpend. The determined or obtained value is expressed as "Wzmptotal". It is a vector in two-dimension defined by the X and Y directions.

Then, the terminal divergent component induced by the leg motion is determined. Its simplest way of determination is to generate the leg motion in the gait generator from the aforesaid gait parameters of the steady turning gait, to determine ZMPfeet[i] (i=0, 1, . . . k) from Eqs. 1 and 2, and to substitute it into the right third term of Eq. 26. Although the volume of calculation is large, the calculation could be completed within the control cycle if there is used a microcomputer that has a high-performance but is still able to be mounted on the robot 1. When the performance of microcomputer is not high, if sample time is set to be longer the control cycle when conducting the calculation, although slight calculation error will happen, the volume of calculation can also be decreased, The value, thus determined or obtained is expressed as "Wfeet". It is also a vector in two-dimension defined by the X and Y directions.

From the above, we obtain the following equation (Eq. 27):

$$q[k]=\exp(\omega 0 k \Delta t)*q[0]+Wzmp\text{total}+W\text{feet} \qquad \text{Eq. 27}$$

Here, expressing the terminal divergent component of the steady turning gait viewed from the supporting leg coordinate system of the gait next to the steady turning gait as q'[k], it must satisfy following equation (Eq. 28).

$$q[0]=q'[k] \qquad \text{Eq. 28}$$

While, expressing supporting leg coordinate system of the gait next to the steady turning gait (X", Y" coordinate system in FIG. 13) viewed from the supporting leg coordinate system of the steady turning gait (X', Y' coordinate system in FIG. 13), by a rotation matrix M indicating rotation of the coordinate system and a parallel translation vector B indicating the origin coordinate of the coordinate system, it will be as shown in the following equation (Eq. 29).

$$q[k]=Mq'[k]+B \qquad \text{Eq. 29}$$

From Eqs. 28 and 29, we obtain Eq. 30.

$$q[k]=Mq[0]+B \qquad \text{Eq. 30}$$

Further, from Eqs. 30 and 27, we obtain Eq. 31.

$$Mq[0]+B=\exp(\omega 0 k \Delta t)*q[0]+Wzmp\text{total}+W\text{feet} \qquad \text{Eq. 31}$$

When expressing the inverse matrix of the matrix A as inv(A), we obtain Eq. 32 from Eq. 31. In the equation, I indicates a unit matrix.

$$q[0]=\text{inv}(M-\exp(\omega 0 k \Delta t)I)(Wzmp\text{total}+W\text{feet}-B) \qquad \text{Eq. 32}$$

Based on the principle of determination mentioned above, explaining the steady turning gait's initial divergent component with reference to the flow chart of FIG. 15, the program begins in S100 in which the terminal divergent component induced by the desired ZMP is determined in the manner mentioned above. The program then proceeds to S102 in which the terminal divergent component induced by the leg motion is determined using the right third term of Eq. 26, and to S104 in which the steady turning gait's initial divergent component q[0] is determined using Eq. 32. The steady turning gait's initial divergent component q[0] is a value viewed from the supporting leg coordinate system of the steady turning gait. The program then proceeds to S106 in which the steady turning gait's initial divergent component q[0] is converted into a value viewed from the supporting leg coordinate system of the current time gait. This value is named q".

The next processing is to correct the provisionally-determined current time gait parameters such that the terminal divergent component of the current time gait becomes equal to q". Since the processing is almost same as that in the steady turning gait, the variables, values and symbols will newly amended to be corresponding to those of the current time gait.

In this embodiment, the parameters correction is to be made only for the ZMP trajectory parameters. Although the other gait parameters may be corrected, since the relationship between a parameter correction amount and the terminal divergent component becomes normally non-linear, it is accordingly impossible to obtain the correction amount analytically.

The ZMP is corrected by adding a ZMP correction amount (correction amount or additive amount) to the provisionally-determined desired ZMP (hereinafter referred to as "provisional desired ZMP"). FIG. 16 illustrates the relationship between them.

As illustrated in the figure, the desired ZMP parameter is corrected such that the desired ZMP (ZMPtotal)=the provisional desired ZMP+the ZPM correction amount.

For ease of understanding, all variables are assumed to be linear in the following.

Figure 16:
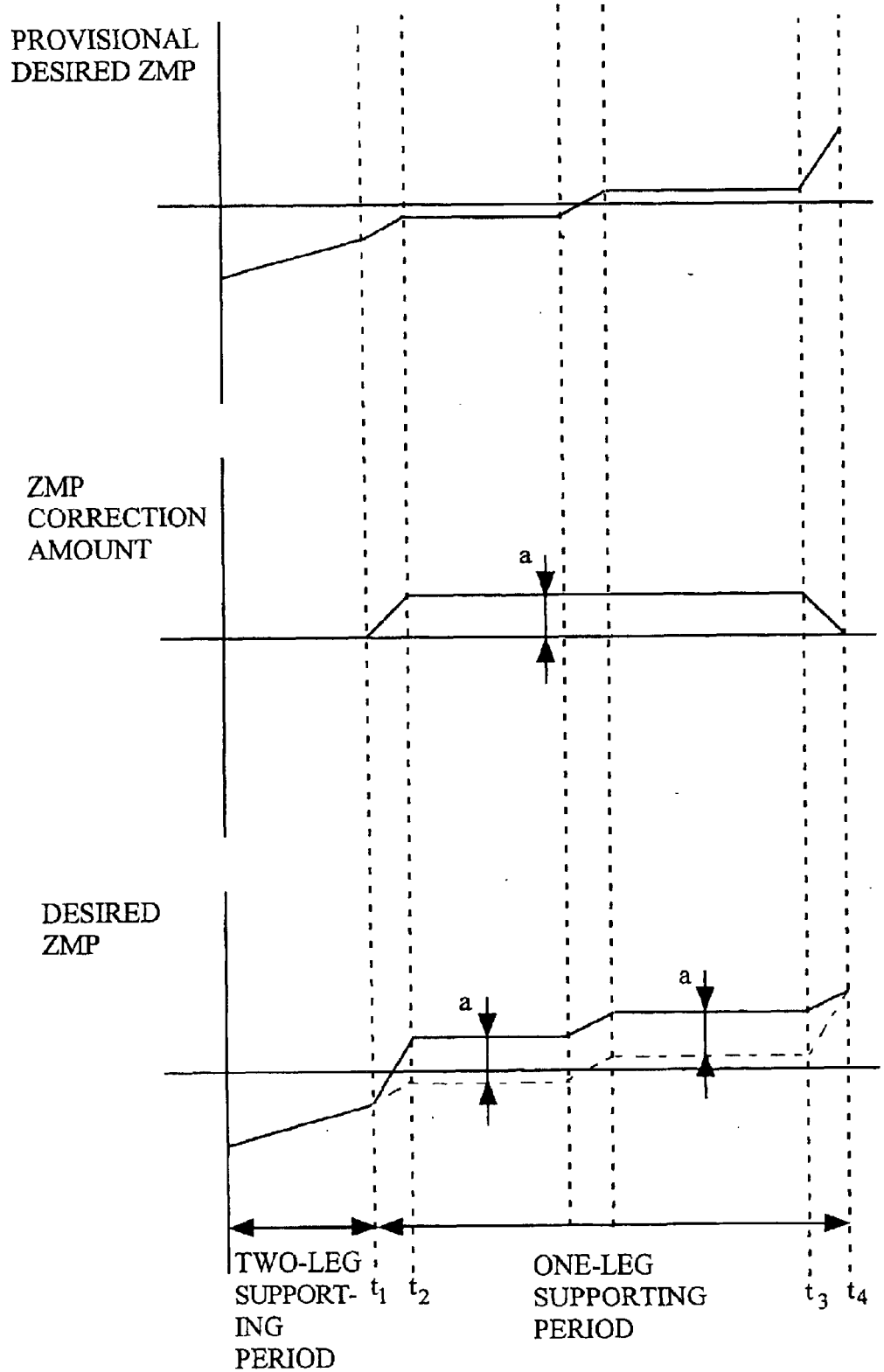
FIG. 16 is a set of time charts explaining correction of a desired ZMP of current time gait parameters conducted in the processing of the flow chart of FIG. 12 based on the initial divergent component calculated by the processing shown in FIG. 15.

The ZMP correction amount is trapezoidal as shown in the middle of FIG. 16 and its height is expressed as "a". Since the relationship between the desired ZMP and the terminal divergent component is linear, the terminal divergent component Wzmptotal induced by the desired ZMP pattern can be expressed by Eq. 33.

$$Wzmp\text{total}=Wzmp\text{tmp}+a*W\text{trim} \qquad \text{Eq. 33}$$

In the equation, Wzmptmp indicates the terminal divergent component induced by the provisional desired ZMP of the current time gait. Wtrim indicates the terminal divergent component induced by the ZMP correction amount when a is set to be 1. They are obtained or determined analytically in the manner of determining the terminal divergent component induced by the desired ZMP pattern of the steady turning gait.

Since the terminal divergent component p[k] is p", we obtain Eq. 34 from Eqs. 27 and 33.

$$q"=\exp(\omega 0 k \Delta t)*q[0]+Wzmp\text{tmp}+a*W\text{trim}+W\text{feet} \qquad \text{Eq. 34}$$

Here, q[0] is the initial divergent component of the current time gait (i.e., initial inverted pendulum position+(initial inverted pendulum velocity/$\omega 0$)). Accordingly, we obtain Eq. 35.

$$a=(q"-\exp(\omega 0 k \Delta t)*q[0]-Wzmp\text{tmp}-W\text{feet})/W\text{trim} \qquad \text{Eq. 35}$$

Finally, correcting the desired ZMP parameters such that the sum of the provisional desired ZMP and the ZMP correction amount becomes the desired ZMP, the terminal divergent component of the current time gait becomes equal to q" (that corresponds to the initial divergent component of the steady turning gait viewed from the current time gait).

Returning to the explanation of the flow chart of FIG. 12, the program proceeds to S30 in which the current time gait is corrected. Specifically, the current time gait parameters are corrected such that the current time gait's terminal divergent component becomes equal to the steady turning gait's initial divergent component q".

Figure 17:
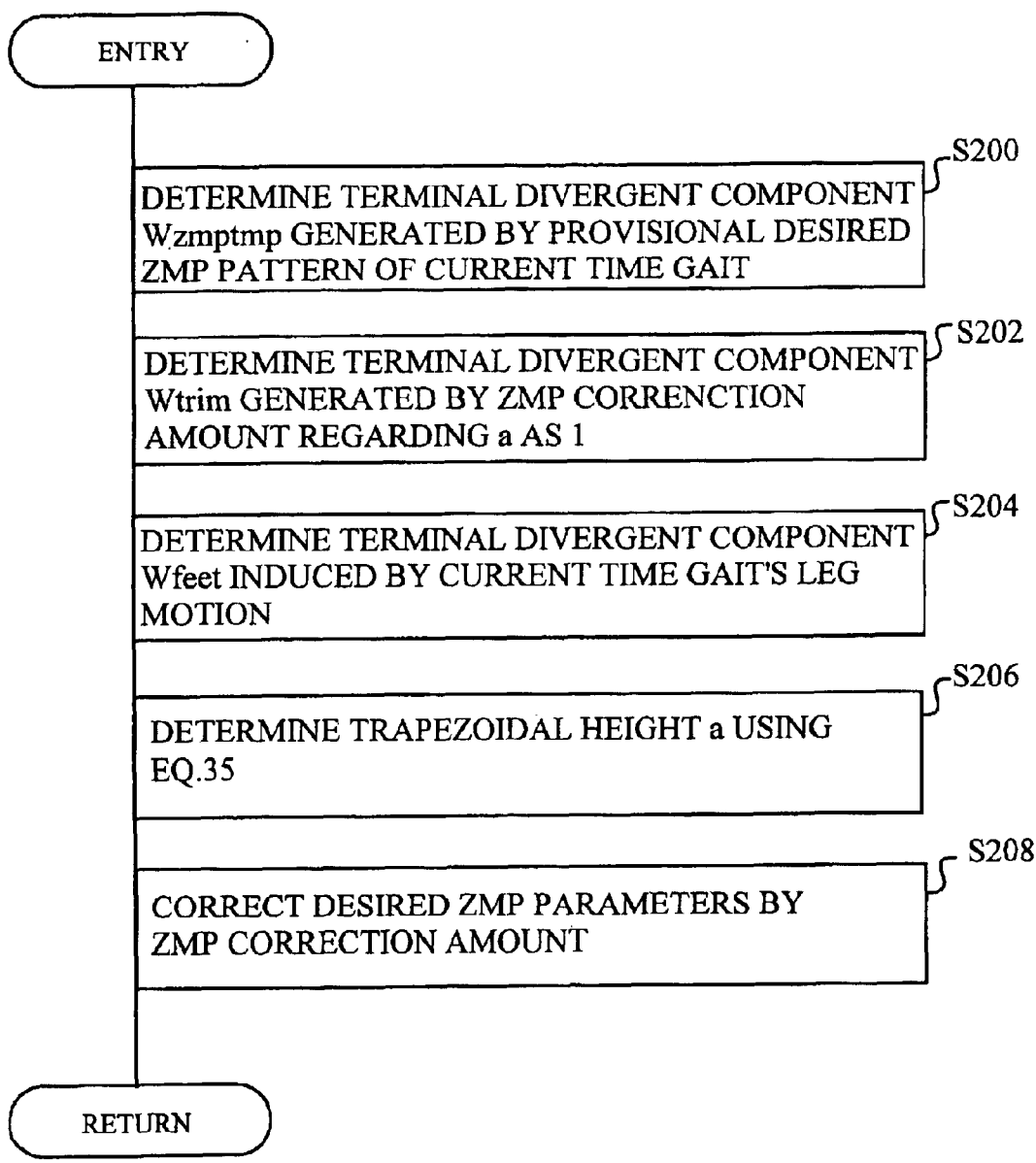
FIG. 17 is a subroutine flow chart showing the correction of the desired ZMP of the current time gait parameter conducted in the processing of the flow chart of FIG. 12 based on the initial divergent component.

FIG. 17 is a flow chart showing the subroutine for correcting the current time gait parameters.

Explaining it, the program begins in S200 in which the terminal divergent component Wzmptmp induced by the current time gait's provisional desired ZMP is determined. The program then proceeds to S202 in which the terminal divergent component Wtrim induced by the ZMP correction amount regarding a as 1, is determined.

The program then proceeds to S204 in which the terminal divergent component Wfeet induced by the current time gait's leg motion is determined, to S206 in which the current time gait's initial divergent component q[0] is determined from the inverted pendulum's initial position and velocity and the trapezoidal height a is calculated by substituting the obtained q[0] into Eq. 35. The program then proceeds to S208 in which the desired ZMP parameters are corrected in the manner mentioned above.

The foregoing is processing at the gait switching.

Returning to the explanation of the flow chart of FIG. 12, the program then proceeds to S20 in which instantaneous values of the current time gait are determined from the determined gait parameters.

Figure 18:
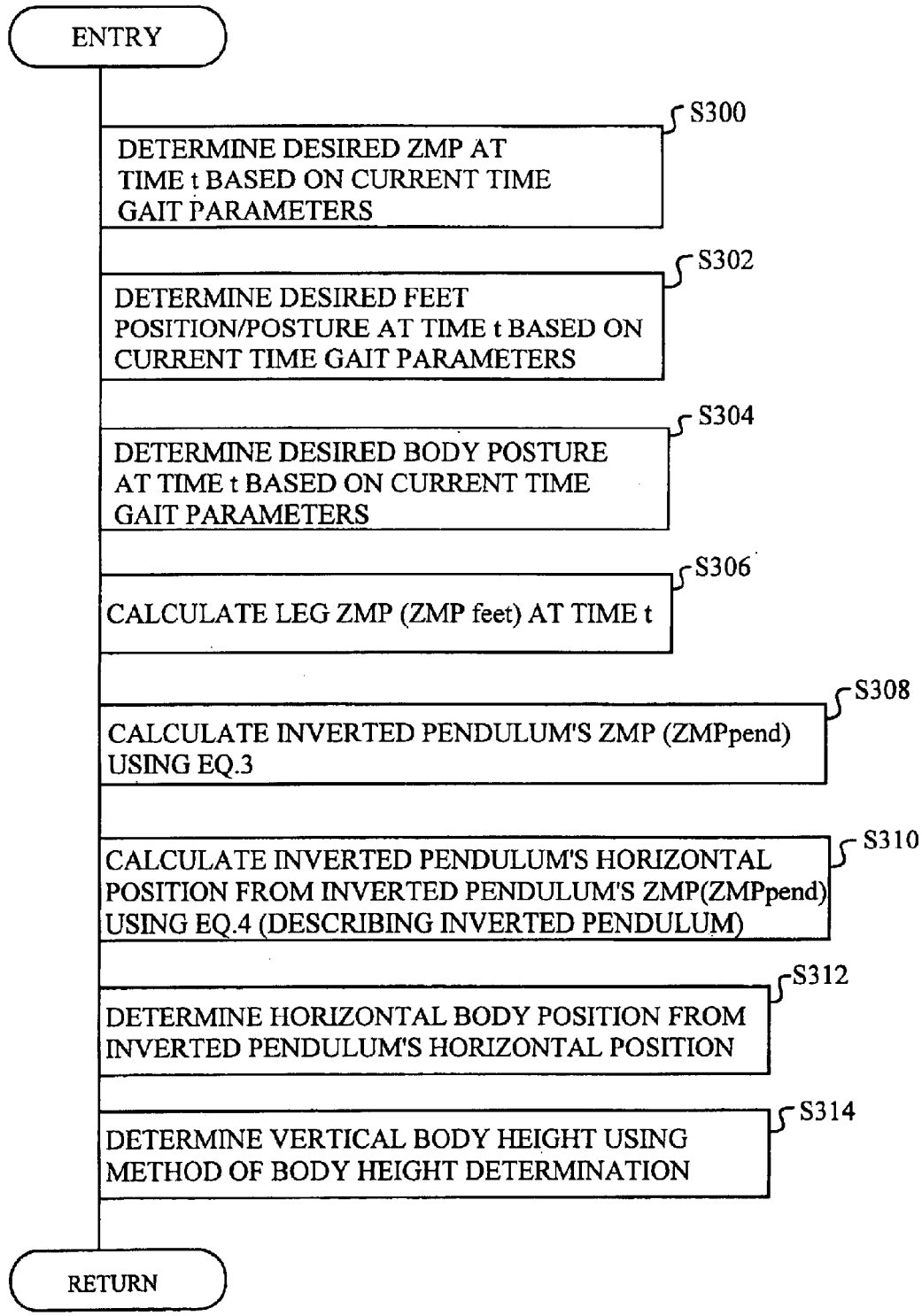
FIG. 18 is a subroutine flow chart showing the calculation of instantaneous values of the current time gait referred to in the flow chart of FIG. 12.

FIG. 18 is a flow chart showing the subroutine for this.

Explaining it, the program begins in S300 in which the desired ZMP at time t is determined based on the current time gait parameters, and proceeds to S302 in which the desired foot position and posture at the time t is determined based on the current time gait parameters.

The program then proceeds to S304 in which the desired body posture at the time t is determined based on the current time gait parameters, to S306 in which the legZMP (ZMPfeet) at the time t is calculated from the desired foot position and posture at and before the time t using Eqs. 1 and 2.

The program then proceeds to S308 in which the inverted pendulum's ZMP (ZMPpend) is calculated using Eq. 3, to S310 in which the inverted pendulum's horizontal position is calculated from the inverted pendulum's ZMP using Eq. 4. The program then proceeds to S312 in which the body's horizontal position is determined from the inverted pendulum's horizontal position. Specifically, as mentioned above, it is determined such that the body-representing point's horizontal position becomes equal to the horizontal position of the mass of the inverted pendulum. The program then proceeds to S314 in which the body height is determined using method of body height determination proposed in Japanese Laid-Open Patent Application Hei 10 (1998)-86080 proposed by the applicant.

Again returning to the explanation of the flow chart of FIG. 12, the program proceeds to S32 in which $\Delta t$ is added to the time t, and the program returns to S14 to repeat the procedures mentioned above.

Additionally explaining the gait generation system according to this embodiment with reference to FIG. 4, the desired gait is generated in the gait generator 100 as mentioned above. Among of the gait parameters of the generated desired gait, the desired body position and posture (trajectory) are directly sent to a robot geometric model (inverse kinematic solution) 102.

The rest of parameters including the desired foot position and posture (trajectory), the desired total floor reaction force central point (i.e., the desired ZMP) (trajectory) and the desired total floor reaction force (trajectory) are directly sent to a composite compliance operation determinator 104. They are also sent to a desired floor reaction force distributor 106 in which the floor reaction force is distributed to each foot (foot 22R(L) and the desired foot floor reaction force central point and the desired foot floor reaction force are determined and are sent to the composite compliance operation determinator 104.

Corrected desired foot position and posture with deformation compensation (trajectory) are sent from the composite compliance operation determinator 104 to the robot geometric model 102. Based on the inputs of the desired body position and posture (trajectory) and the corrected desired foot position and posture with deformation compensation (trajectory), the robot geometric model 102 calculates joint displacement command (values) on the twelve joints (such as the joint 10R(L) so as to satisfy the trajectories and send the same to a displacement controller 108. The displacement controller 108 controls the displacement of the twelve joints of the robot 1 so as to follow the joint displacement command (values) calculated by the robot geometric model 102.

The floor reaction force induced in the robot by the joint displacement is detected by an actual foot floor reaction force detector 110 (i.e., the force sensor 34), and the detected value is sent to the composite compliance operation determinator 104. Posture inclination error $\theta errx$ or $\theta erry$ is detected by the inclination sensor 36 and the detected value is sent to a posture stabilization controller 112 in which compensating total floor reaction force's moment about the desired total floor reaction force central point is calculated for posture stabilization and is sent to the composite compliance operation determinator 104. The determinator 104 corrects the desired value(s) in response to the inputted value.

Since the gist of the present invention resides in the robot gait generation in the gait generator 100 and since the configuration and operation of the other components such as the composite compliance operation determinator 104 are described in detail such as in Japanese Laid-Open Patent Application No. Hei 10 (1998)-277969 proposed by the applicant, no further explanation will be made.

Having been configured in the foregoing manner, the gait generation system of a legged mobile robot according to the embodiment of the present invention can eliminate the aforesaid problems of Japanese Laid-Open Patent Application No. Hei 10 (1998)-86081 proposed by the applicant earlier, and can generate a gait of any stride, turning angle and walking period, etc., that satisfies the dynamic equilibrium condition, freely and on a real-time basis. In addition, it can generate a gait which ensures the displacement and velocity of each part of the robot continuous at a boundary between the next gait.

Figure 19:
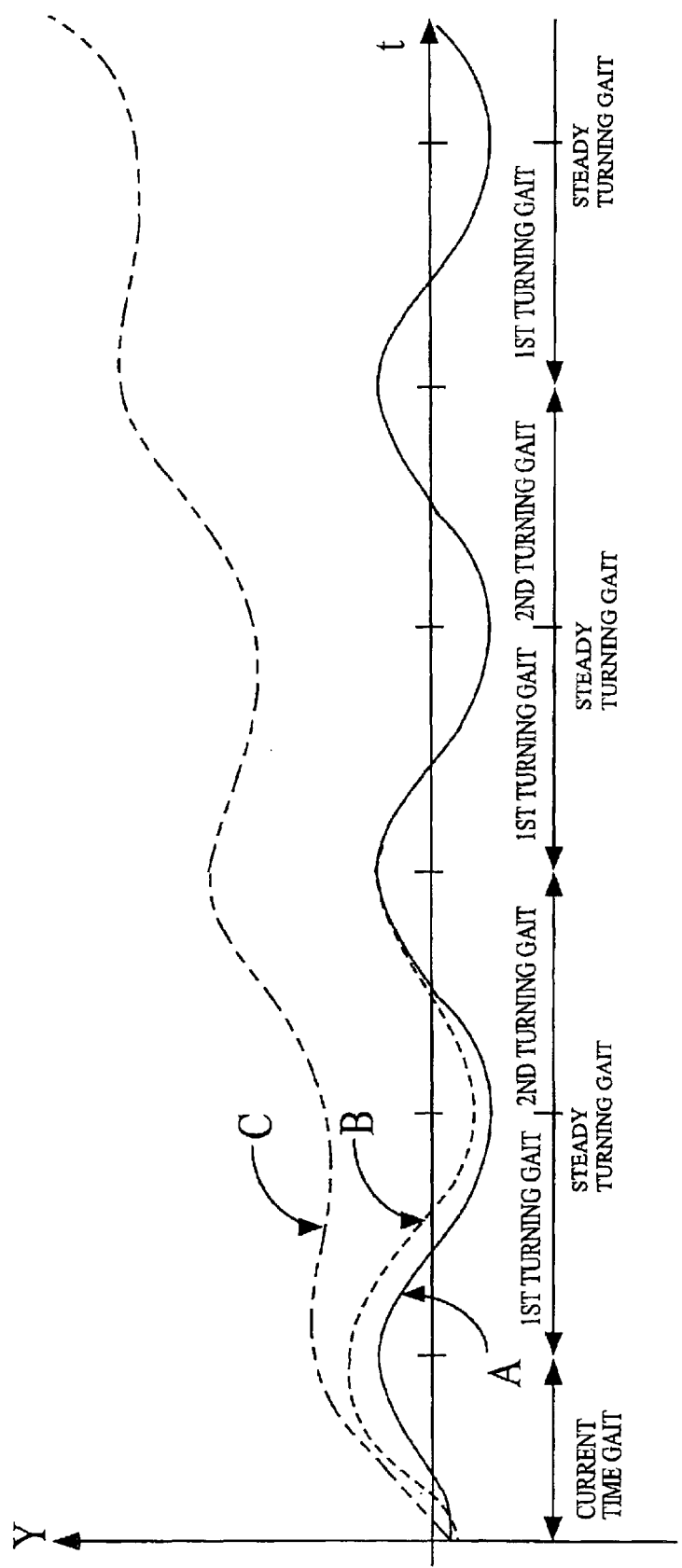
FIG. 19 is a time chart showing the body trajectory generated by the gait generation system of a legged mobile robot according to the first embodiment of the present invention.

These will be discussed more specifically. FIG. 19 is a time chart showing a trajectory of the body-representing point in the Y-direction (i.e., the left and right directions). The gait generation system of a legged mobile robot according to this embodiment can generate a gait in such a way that the body-representing trajectory (marked by B) gradually approaches or converges to the body-representing trajectory of the steady turning gait (marked by A).

Further, since the system simplify the dynamic model of the legged mobile so as to enhance the linearity, it can generate a gait by predicting future robot behavior. Furthermore, since it can generate any other motion than the walking motion on a real-time basis, it can make the other motion to be continuous with the walking motion.

It should be noted in the above that the three-material-point model illustrated in FIG. 5 is not always indispensable. Instead of the three-material-point model illustrated in FIG. 5, the single-material-point model such as disclosed in Japanese Patent Publication No. Hei 4 (1992)-15068 can be used in this embodiment. In doing so, it will be equivalent to set the value of leg motion to zero in this embodiment. Although the accuracy of approximation drops, since the divergent component induced by the leg motion becomes zero, the volume of calculation decreases.

Figure 20:
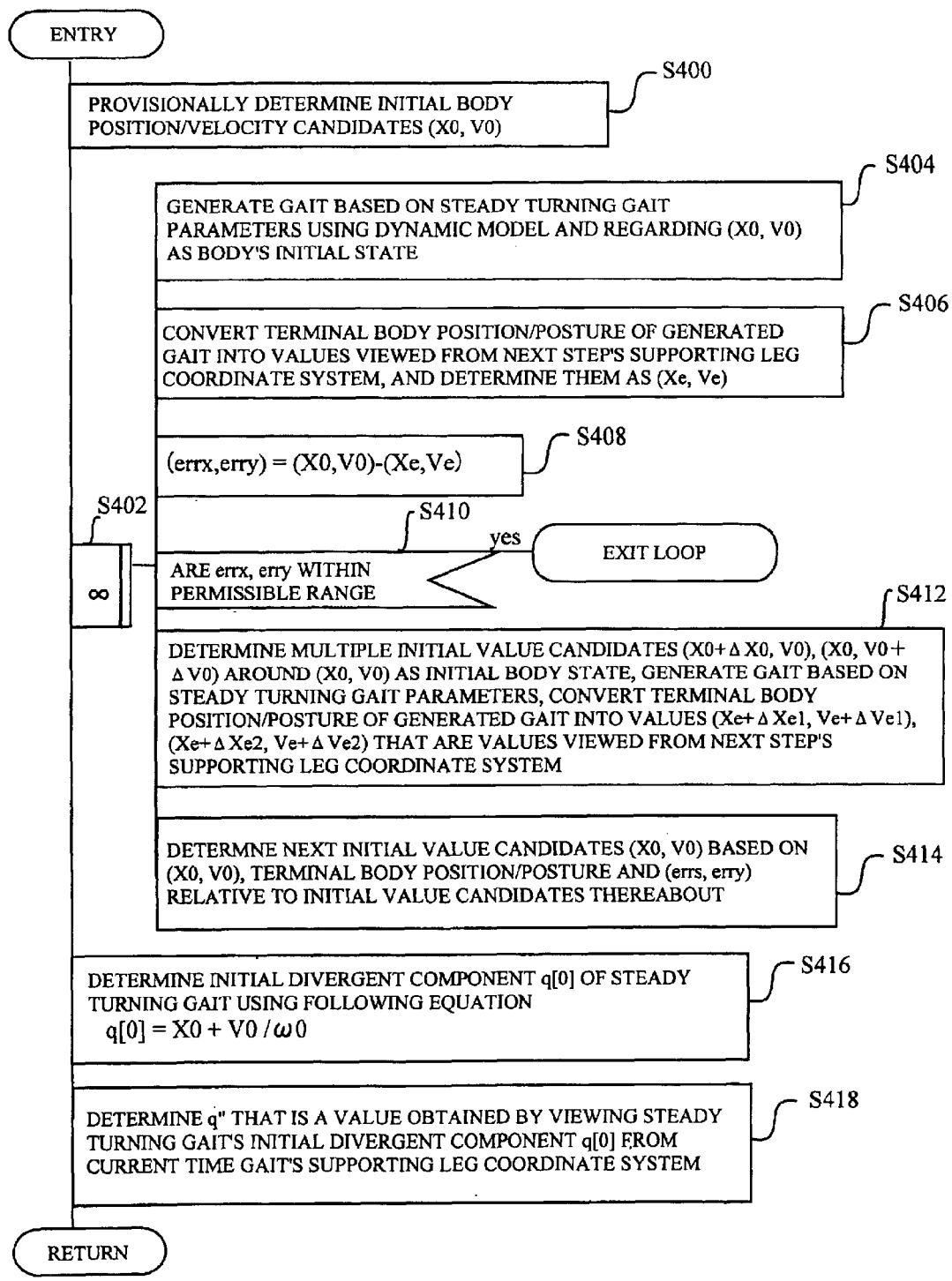
FIG. 20 is a subroutine flow chart, similar to FIG. 15, but showing the calculation of the initial divergent component of the steady turning gait, that is the operation of a gait generation system of a legged mobile robot according to a second embodiment of the present invention.

FIG. 20 is a subroutine flow chart, similar to FIG. 15, but partially showing the calculation of the steady turning gait's initial divergent component in a gait generation system of a legged mobile robot according to a second embodiment of the present invention.

It is stated in the first embodiment, that, instead of the three-material-point model, a single-material-point model can be used. In the second embodiment, based on the supposition that the performance of the on-board CPU (first arithmetic unit 60) is markedly high, instead of the three-material-point model, there is used the model (illustrated in FIG. 23) in which every link is set with mass. In other words, a non-linear model is used in the second embodiment to conduct gait generation.

Explaining the operation of the system according to the second embodiment, after conducting the same procedures as those shown from S10 to S28, via S26, of the flow chart of FIG. 12, the program proceeds to a subroutine flow chart of FIG. 20 to determine the initial divergent component of the steady turning gait.

In the flow chart of FIG. 20, the program begins in S400 in which the initial body position and velocity candidates (X0, V0) are provisionally determined. The body position and velocity indicate the position and velocity of the body-representing point. For ease of explanation, only the determination in the X-direction is discussed. Actually, however, the position and velocity should be searched in both the X and Y-directions simultaneously or separately. If they should be searched in the X and Y-directions simultaneously, the space of search will be a quartic-dimension comprising an X-position, a Y-position, an X-velocity and a Y-velocity.

The program then proceeds, via S402, to S404 in which a gait from the time 0 to the terminal is generated based on the steady turning gait parameters regarding (X0, V0) as the initial states of the body, using the dynamic model (the non-linear model with every link set with a material point as illustrated in FIG. 23). Specifically, by obtaining the desired ZMP, the desired foot position and posture and the desired body posture, by assuming the body's position and velocity as (X0, V0), and by using the dynamic model, the body trajectory to satisfy the desired ZMP is generated. Similarly to the first embodiment, the gait generation is made only in the gait generator 100 and the generated gait is not outputted therefrom.

Figure 14:
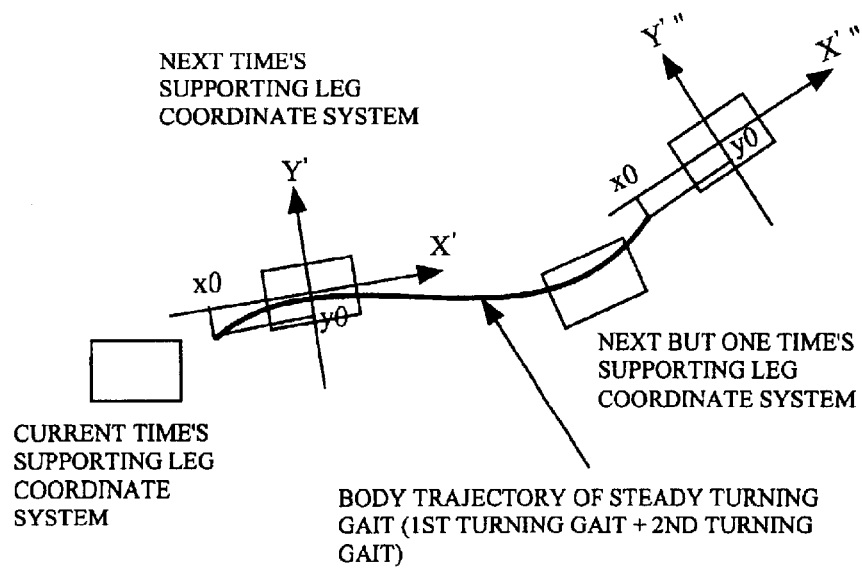

The program then proceeds to S406 in which the terminal body position and velocity of the generated gait are converted into values viewed from the supporting leg coordinate system of the next walking step (the same coordinate system as the X''', Y'''-coordinate system illustrated in FIG. 14), and determine or express the values as (Xe, Ve).

The program then proceeds to S408 in which errors (errx, erry) between (X0, V0) and (Xe, Ve) are calculated as illustrated. Since (X0, V0) and (Xe, Ve) must be equal to each other in the steady turning gait, a search should be made to decrease the difference therebetween becomes zero.

The program then proceeds to S410 in which it is determined whether the determined errors are within individual permissible ranges. The permissible ranges indicates limits of deviation of the position and velocity at the boundary conditions. Instead of the permissible ranges, the configuration may be altered to determine whether an initial divergent component (X0+V0/ω0) and an initial convergent component (X0−V0/ω0) are within individual permissible ranges.

When the result in S410 is negative, the program proceeds to S412 in which a plurality of initial value candidates (X0+ΔX0, V0), (X0, V0+ΔV0) are determined around (X0, V0) and assuming the candidates as the initial body states, the gait is generated based on the gait parameters of the steady turning gait, and obtain (Xe+ΔXe1, Ve+ΔVe1), (Xe+ΔXe2, Ve+ΔVe2) that are values obtained by converting the generated gait's terminal body position and velocity into values viewed from the supporting leg coordinate system in the next walking step.

The program then proceeds to S414 in which next initial value candidates (X0, V0) are determined based on (X0, V0), the terminal body position and velocity relative to the initial value candidates thereabout and the aforesaid errors.

These procedures are repeated insofar as the result in S410 is negative. On the other hand, when the result is affirmative, the program exits the repetitive loop (S402) and proceeds to S416 in which the steady turning gait's initial divergent component q[0] is determined using the equation illustrated there. The program then proceeds to S418 in which the same procedure as that illustrated in S106 of FIG. 15 in the first embodiment is conducted.

Although the linear three-material-point model as used in the first embodiment is not used here, since the concept of the divergent component and the convergent component can similarly be applied to a perturbation amount in behavior of the non-linear model as disclosed in FIG. 23, with sufficient accuracy of approximation, it is possible to define the divergent component using the same equations as those used in the first embodiment.

The program then proceeds to a step, that is similar to S30 in FIG. 12, in which the gait parameters of the current gait are corrected.

Figure 21:
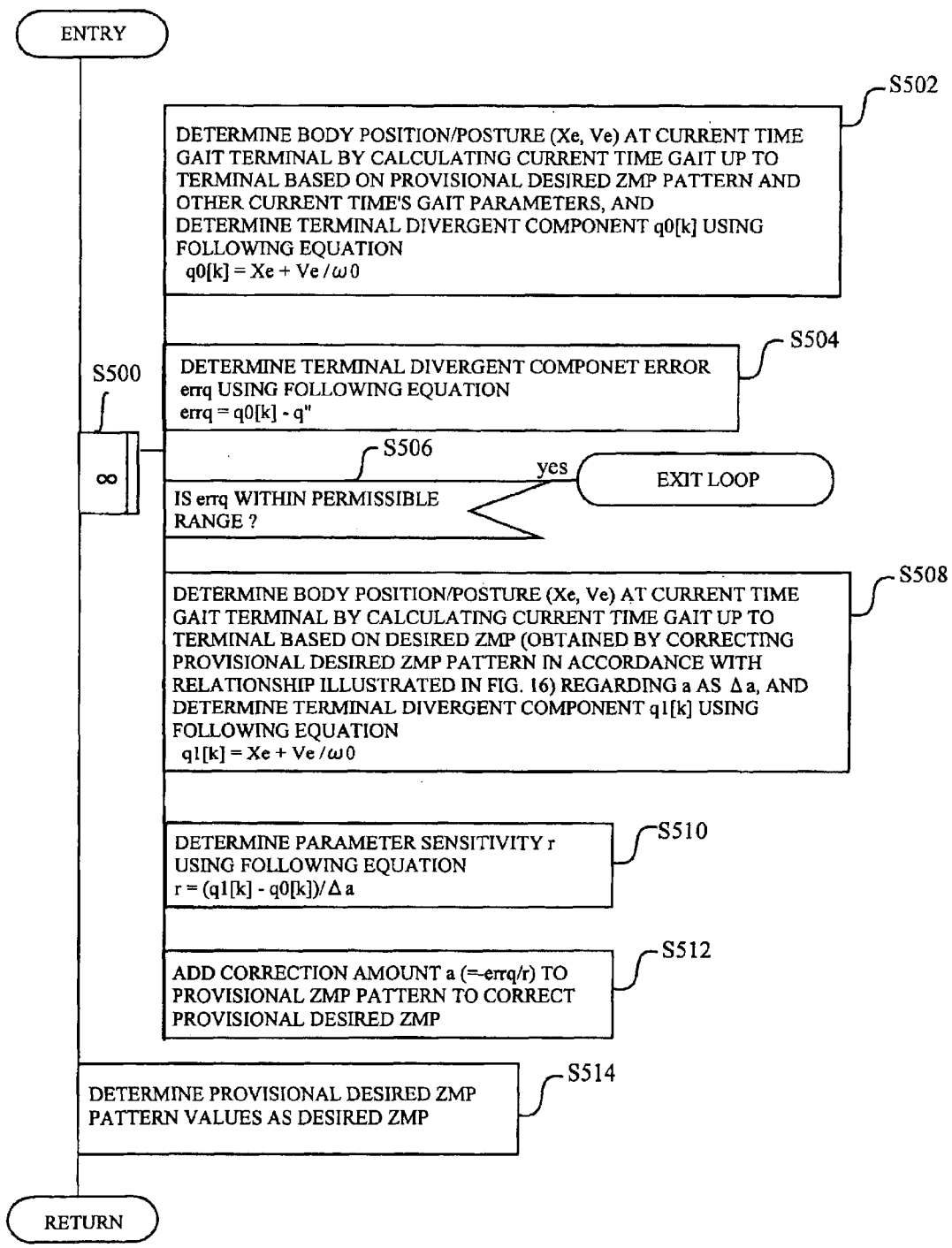
FIG. 21 is a subroutine flow chart, similar to FIG. 17, but showing the correction of the desired ZMP of the current time gait parameter in the operation of the gait generation system of a legged mobile robot according to the second embodiment.

FIG. 21 a flow chart showing the subroutine for it.

Explaining it, the program proceeds, via S500, to S502 in which the body position and velocity (Xe, Ve) at the terminal of the current time gait are determined based on the provisional desired ZMP pattern and the other current time gait parameters by calculating the current time gait up to the terminal, and the terminal divergent component q[0] is calculated using the equation illustrated there.

The program then proceeds to S504 in which the terminal divergent component error errq is determined using the equation illustrated there, to S506 in which it is determined whether the error is within a permissible range. When the result is negative, the program proceeds to S508 in which the body position and velocity (Xe, Ve) at the current gait terminal are determined by calculating the current time gait up to the terminal based on the desired ZMP obtained by correcting the provisional desired ZMP pattern according to the relationship illustrated in FIG. 16 regarding a as Δa, and a terminal divergent component q1[k] is determined using the equation illustrated there. In S508, Δa is a constant of an appropriately set fine value. The value Δa may be set such that it decrease as the error errq decreases with repetitive calculation. Even it is set to a fixed constant, the error will be fallen within the permissible range by the repetitive calculation.

The program then proceeds to S510 in which a parameter sensitivity r is determined using the equation illustrated there, to S512 in which a correction amount in the manner illustrated there is added to the provisional desired ZMP pattern to correct the same.

These procedures are repeated insofar as the result in S506 is negative. When the result is affirmative, on the other hand, the program exits the repetitive loop (S500) and proceeds to S514 in which the provisional desired ZMP finally obtained is determined as the desired ZMP.

Explaining the above, when the gait is generated in accordance with the current time gait parameters using the dynamic model and the gait is repetitively generated continuously in accordance with the steady turning gait parameters, in order to make the generated gait to converge to the steady turning gait, the terminal divergent component of the current gait must completely or almost completely be equal to q'' that is a value obtained by viewing the steady turning gait's initial divergent component q[0] from the current time gait's supporting leg coordinate system.

In view of the above, also in the second embodiment, the desired ZMP pattern in the gait parameters of the current time gait is corrected to satisfy this condition.

It should be noted that, also in the second embodiment, the current time gait parameters may be corrected such that body position and velocity are equal to each other at the steady gait boundary. However, comparing with the case that only the boundary condition relating to the divergent component should be satisfied, the conditions will be stricter, the parameters to be corrected should be increased by two times and the search space will be increased.

It should also be noted that, if the body position and velocity should be made equal to each other by correcting the desired ZMP, waveform of ZMP correction amount will not be a simple trapezoidal such as shown in FIG. 16. Rather, it will be a complicated form of two stage trapezoid, for example, and the correction amount will tend to increase.

Explaining this again referring to FIG. 19, as mentioned above, the trajectory marked by A indicates the body-representing point trajectory in which the current time gait is generated such that body-representing point's position and velocity are equal to each other at the boundary with the steady turning gait and then the steady turning gait is generated. The trajectory marked by B indicates the body-representing point trajectory in which the current time gait is generated such that its terminal divergent becomes equal to q" and a continuous gait is repetitively generated using the steady turning gait parameters.

As illustrated, the trajectory B deviates from the trajectory at the boundary of the current time gait and the first steady turning gait, but, gradually approaches (converges to) the trajectory A in due course and becomes almost equal to the trajectory A at the next steady turning gait. Thus, even the method of gait generation in which only the divergent component is made equal to each other, can prevent gait divergence, similar to the method of gait generation in which even the position and velocity are made equal to each other.

A trajectory marked by C indicates a trajectory in which the gait generation is conducted without paying any attention thereto. Such a trajectory will deviate from the trajectory A with respect to time. The method of gait generation to make even the position and velocity equal to each other is, in other words, that to make not only the divergent component but also the convergent component are made equal to each other. Therefore, this method of gait generation in which even the position and velocity are made equal to each other is a specific example of the gait generation method in which only the divergent component is made equal to each other.

Other parameters than the desired ZMP may be corrected (this is the same as the first embodiment). For ease of explanation, only a linear search in the X-direction is described. Actually, the number of dimensions are increased as in the case of searching the initial value of the body position and velocity of the steady turning gait.

In the second embodiment, although a pseudo Newton method (or the method for determining a Jacobian (i.e., sensitivity matrix) in (X0, V0) to determine the next candidate) is used, other search method such as the simplex method can instead be used. Further, it is alternatively possible to conduct calculations for search for the parameters in advance to prepare them as mapped data.

It should further be noted that the method of gait generation in the second embodiment using the non-linear model in a searching manner can be utilized to a linear model such as the three-material-point model (or the single-material-point model) used in the first embodiment to obtain the gait in an analytic manner. However, since the gait can be determined analytically, there is little advantage to use such a searching method, that is poor in efficiency. In conclusion, any dynamic model can be used, if it exhibits a sufficient accuracy of approximation.

In the first embodiment or in the second embodiment, if the gait is continually generated in line with the supposed steady turning gait, the ZMP correction amount is zero, the determined desired ZMP generated as the current time gait is equal to the ZMP (provisional desired ZMP) of the supposed steady turning gait. Since the ZMP of the steady turning gait is set to have high margin of stability, the current time gait has high margin of stability insofar as the gait generation is continued in line with the supposed turning gait.

On the other hand, if it is attempted to generate a gait that is different greatly from the steady turning gait supposed one walking step earlier, since the absolute value of the ZMP correction amount becomes large, the desired ZMP trajectory determined as the current time gait deviates markedly from an ideal trajectory, the margin of stability becomes low. For example, if it is attempted to turn the robot to the right, the gait should be generated to shift the center of gravity to the right. If a demand is made to cause the robot to turn to the left abruptly at the next walking step, the desired ZMP trajectory must be shifted to the right large so as to shift the center of gravity from right to left. This lowers the margin of stability and the robot is liable to turn over to the right.

For that reason, the steady turning gait to be supposed should preferably set to be close to a gait that would be generated. To cause the robot to walk by the steady turning gait is a limited case and usually, a gait that deviates from the steady turning gait large will be generated. In the method of steady turning gait generation mentioned above, it is set to be close to a gait to be generated future.

Methods of steady turning gait generation other than the above will then be explained in 1) to 4). Except for 4), a deviation between the steady turning gait and a gait generated future is liable to increase, but calculation is made easier.

1) The next but one time's supporting leg coordinate system and the next but one time's walking period may be determined by prediction or extrapolation based on the current time supporting leg coordinate system, the current time's walking period and a waling history up to that time, based on the supposition that the walking velocity or turning velocity of the gait to be generated does not change abruptly.

2) The steady turning gait may not necessarily be a straight walking gait. In that case, however, as the turning velocity increases, the ZMP correction amount increases and hence, the margin of stability is lowered.

3) The steady turning gait may be a standstill gait or a gait in which the robot is kept standing but its feet are moved up and down in turn. As the walking speed increases, the ZMP correction amount increases and the margin of stability is lowered. The standstill gait indicates a still gait without movement.

4) A transitional gait may be added or inserted between the current time gait and the steady turning gait. Although calculation for behavior prediction will be complicated, since the constraint condition (boundary condition) in determining the steady turning gait becomes loose and since it becomes possible to set steady turning gait more close to a desired one, it can further enhance the margin of stability.

It is possible to combine 3) and 4). A gait generation system of a legged mobile robot according to a third embodiment of the present is made with focus on this.

Figure 22:
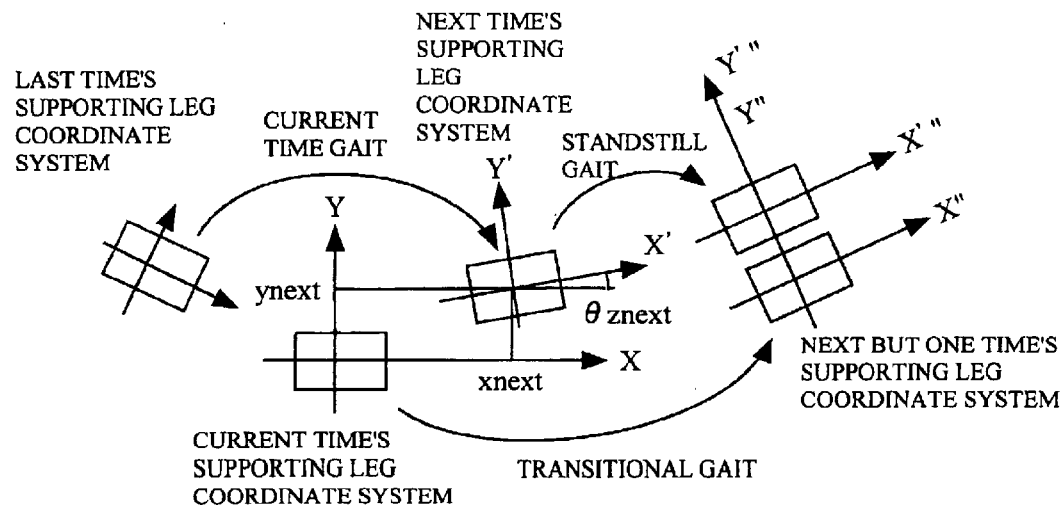
FIG. 22 is a view, similar to FIG. 13, but showing examples of the steady turning gait used in a gait generation system of a legged mobile robot according to a third embodiment of the present invention.

FIG. 22 is a view, similar to FIG. 13, but showing partially the operation, more specifically, the setting of other steady turning gait, of the system according to the third embodiment.

Specifically, as illustrated in FIG. 22, the embodiment is configured in such a manner that the steady turning gait includes the standstill gait, and that the transitional gait (transition gait and includes any gait other than the steady turning gait) is inserted between the current time gait and the standstill gait (steady turning gait).

Thus, by setting three gaits comprising the current time gait, the transitional gait and the standstill gait, it becomes possible to effectively prevent the posture divergence. Further, since the gait is generated in such a way that the robot can shift to the standstill state at any time, it can realize a stopping motion with high margin of stability even when a sudden stop demand is made.

More specifically, deeming the standstill gait as a kind of the steady turning gaits, the aforesaid algorithm of steady turning gait's initial divergent component should be used. However, since the body's material point velocity at stop is 0, the divergent component is always equal to the inverted pendulum's material point position. Accordingly, the divergent component can be easily obtained without using the algorithm.

Having been configured in the foregoing manner, the third embodiment can generate a gait having high margin of stability freely and on a real-time basis, similarly to the first embodiment and the second embodiment.

As stated in the above, the first to third embodiments are configured to have a system (gait generator 100) for generating a gait of a legged mobile robot 1 having at least a body 24 and a plurality of, more precisely two legs (leg links) 2 each connected to the body, comprising: a dynamic model (illustrated in FIGS. 5 and 6) that expresses relationship between motion of the leg and the body, and a floor reaction force (more specifically, the ZMP); current time gait parameter provisionally-determining means (S24) for provisionally determining parameters of a current time gait including at least parameters determining a trajectory of the leg (desired foot position and posture) and a trajectory of the floor reaction force (desired total floor reaction force central point trajectory (desired ZMP trajectory)), in response to at least a demand (next time gait's supporting leg coordinate system, next but one time gait's supporting leg coordinate system, current time gait period, next time gait period, etc., S22); periodic gait parameter supposing means (S26) for supposing (or determining) the parameters of a periodic gait (steady turning gait) succeeding to the current time gait in response to at least the demand; current time gait parameter correcting means (S30, S200–S208) for correcting at least the provisionally determined parameters of the current time gait such that the trajectory of the body (desired body position and posture trajectory) determined based on the dynamic model and the parameters of the current time gait and the periodic gait succeeding thereto substantially converges or becomes equal to a trajectory of the body of the periodic gait determined from the parameters of the periodic gait; and current time gait instantaneous value determining means (S20, S300–S314) for determining instantaneous values of the current time gait based on at least the corrected parameters of the current time gait.

Further, they are configured to have a system (gait generator 100) for generating a gait of a legged mobile robot 1 having at least a body 24 and a plurality of, more precisely, two legs (leg links) 2 each connected to the body, comprising: a dynamic model (illustrated in FIGS. 5 and 6) that expresses relationship between motion of the leg and the body, and a floor reaction force (more specifically, the ZMP); current time gait parameter provisionally-determining means (S24) for provisionally determining parameters of a current time gait including at least parameters determining a trajectory of the leg (desired foot position and posture trajectory) and a trajectory of the floor reaction force (desired total floor reaction force central point trajectory (desired ZMP trajectory)), in response to at least a demand (S22); periodic gait parameter supposing means (S26) for supposing (or determining) the parameters of a periodic gait (steady turning gait) succeeding to the current time gait in response to at least the demand; periodic gait boundary divergent component determining means (S28, S100–S106) for determining a periodic gait boundary divergent component (initial divergent component of the steady turning gait) that is a value indicating a divergent component at gait boundary when behavior of the body of the periodic gait is approximated by the dynamic model, based on the parameters of the periodic gait; current time gait parameter correcting means (S30, S200–S208) for correcting the parameters of the current gait such that the divergent component becomes equal to or becomes substantially equal to each other at terminal of the current gait (terminal divergent component) generated with use of the dynamic model; and current time gait instantaneous value determining means (S20, S300–S314) for determining instantaneous values of the current time gait based on at least the corrected parameters of the current time gait.

Further, it is configured that a transitional gait is inserted between the current time gait and the periodic gait succeeding thereto.

Further, it is configured that the transitional gait includes a standstill gait.

Further, they are configured to have a system (gait generator 100) for generating a gait of a legged mobile robot 1 having at least a body 24 and a plurality of, more precisely, two legs (leg links) 2 each connected to the body, comprising: leg reaction force calculating means (leg ZMP calculator 200, S20, S306) for calculating a leg reaction force, more specifically, a leg ZMP (ZMPfeet) that is a resultant force (total inertial force) of inertial force and gravity induced by a motion of the leg, without depending on behavior of the body; inverted pendulum model supporting point position calculating means (S20, S308) for calculating a position of a supporting point of an inverted pendulum (ZMPpend) that describes dynamic behavior of the body, from at least the calculated leg reaction force and a desired floor reaction force (more specifically, a desired ZMP); inverted pendulum displacement calculating means (S20, S310) for calculating displacement of the inverted pendulum, more precisely, the inverted pendulum's material point position (inverted pendulum's horizontal position xb) based on at least the calculated position of the supporting point of the inverted pendulum; body position calculating means (body position determinator 202, S20, S312, S314) for calculating a position of the body, more precisely, a body's horizontal position based on at least the calculated displacement of the inverted pendulum; and gait generating means (S20, S300–S314, gait generator 100) for generating a gait based on at least the calculated position of the body.

They are configured to have a system (gait generator 100) for generating a gait of a legged mobile robot 1 having at least a body 24 and a plurality of, more precisely, two legs (leg links) 2 each connected to the body, comprising: leg ZMP calculating means (leg ZMP calculator 200, S20, S306) for calculating a leg ZMP (ZMPpend) that is corresponding to a ZMP of the leg that is a pseudo value of a resultant force of inertial force and gravity induced by a motion of the leg, without depending on behavior of the body; inverted pendulum model supporting point position calculating means (S20, S308) for calculating a position of a supporting point of an inverted pendulum (ZMPpend) that describes dynamic behavior of the body, from at least the calculated ZMP and a desired ZMP; inverted pendulum displacement calculating means (S20, S310) for calculating displacement of the inverted pendulum, more specifically, the inverted pendulum's material point position (inverted pendulum's horizontal position xb) based on at least the calculated position of the supporting point of the inverted pendulum; body position calculating means (S20, S312, S314, body position determinator 202) for calculating a position of the body based on at least the calculated displacement of the inverted pendulum; and gait generating means (S20, S300–S314, gait generator 100) for generating a gait based on at least the calculated position of the body.

Further, it is configured that the inverting pendulum model supporting point calculating means calculates the supporting point of the inverted pendulum (inverted pendulum's horizontal position xb) by subtracting a product obtained by multiplying the leg ZMP by a second coefficient mfeet/mtotal from a product obtained by multiplying the desired ZMP by a first coefficient mtotal/mb.

Further, they are configured to have a system (gait generator 100) for generating a gait of a legged mobile robot 1 having at least a body 24 and a plurality of, more precisely, two legs (leg links) 2 each connected to the body, comprising: a dynamic model having; a leg reaction force calculating means (leg ZMP calculator 200, S20, S306) for calculating a leg reaction force (leg ZMP (ZMPfeet)) that is a resultant force of inertial force and gravity induced by a motion of the leg, without depending on behavior of the body; inverted pendulum model supporting point position calculating means (S20, S308) for calculating a position of a supporting point of an inverted pendulum (inverted pendulum's ZMP (ZMPpend)) that describes dynamic behavior of the body, from at least the calculated leg reaction force and a desired floor reaction force (desired ZMP); inverted pendulum displacement calculating means (S20, S310) for calculating displacement of the inverted pendulum based on at least the calculated position of the supporting point of the inverted pendulum, more precisely position (inverted pendulum's horizontal position); and body position calculating means (body position determinator 202, S20, S312, S314) for calculating a position of the body (body's horizontal position) based on at least the calculated displacement of the inverted pendulum; current time gait parameter provisionally-determining means (S24) for provisionally determining parameters of a current time gait including at least parameters determining a trajectory of the leg (desired foot position and posture trajectory) and a trajectory of the floor reaction force (desired total floor reaction force central point trajectory (desired ZMP trajectory)), in response to at least a demand (S22); periodic gait parameter supposing means (S26) for supposing the parameters of a periodic gait (steady turning gait) succeeding to the current time gait in response to at least the demand; periodic gait boundary divergent component determining means (S28, S100–S106) for determining a periodic gait boundary divergent component that is a value indicating a divergent component (steady turning gait's initial divergent component) at gait boundary when behavior of the body of the periodic gait is approximated by the dynamic model, based on the parameters of the periodic gait; current time gait parameter correcting means (S30, S200–S208) for correcting the parameters of the current gait such that the divergent component becomes equal to or becomes substantially equal to each other at terminal of the current gait (current time gait's terminal divergent component) generated with use of the dynamic model; and current time gait instantaneous value determining means (S20, S300–S314) for determining instantaneous values of the current time gait based on at least the corrected parameters of the current time gait.

Further, it is configured that the floor reaction force includes at least a ZMP and the inverted pendulum (illustrated in FIGS. 5 and 6) is a linear model.

Next, the calculation of the leg ZMP (ZMPfeet) will additionally be commented.

It is preferable for the leg ZMP (ZMPfeet) determining function to satisfy the following conditions (that in the first embodiment can satisfy all of the conditions):

Condition a) It should be determined based on all or a part of the gait parameters that determine the foot trajectory.

Condition b) It should not be influenced by the motion of the body-representing point.

Condition c) The accuracy of approximation of a simplified model should be sufficiently high.

Condition d) It should be continuous as much as possible (so as to make the body acceleration continuous.)

Among of them, Conditions a) and b) are those for facilitating the predictive calculation. In the embodiments, the leg ZMP is obtained from Eqs. 1 and 2. It may instead be obtained from Eq. 1 and the following equations (Eqs. 36 and 37)

$$\text{leg's total inertial force moment about point } P = mfeet^*(ZMPfeet-xp)^*(G-C^*afeetz) \quad \text{Eq. 36}$$

In the equation, C is a constant. From Eq. 37, feet's center of gravity's acceleration vector afeet is obtained. "afeetz" in Eq. 36 indicates the feet's center of gravity's vertical-directional acceleration vector that is corresponding to the vector afeet with its X and Y components are made zero.

$$afeet = (msup^*d2(xsup)/dt2 + mswg^*d2(xswg)/dt2)/(msup+mswg) \quad \text{Eq. 37}$$

Since the degree of adjustment of Eq. 36 is higher than that of Eq. 2, it can enhance the accuracy of approximation. In Eq. 1 for calculating the leg's total inertial force moment about the point P, the term relating to the leg acceleration can be multiplied by the constant as disclosed. Although the equation is changed to be incorrect in the sense of dynamics, insofar as the accuracy of approximation of the simplified model is enhanced, it is possible.

Then, the setting of the point of action P will be commented.

The point of action P may be set as follows:

1) to set the point of action P at the origin of supporting leg coordinate system of the current time gait or a predetermined point thereabout.

2) to set the point of action P such that it moves continuously during the two-leg supporting period from the last time (just before the current time) gait's supporting leg coordinates system' origin or a predetermined point thereabout to the current time gait's supporting leg coordinate system's origin or a predetermined point thereabout.

3) to set the point of action P such that it becomes equal to the provisional desired ZMP trajectory.

Their characteristic features will additionally be commented.

As regards 1), since the point of action P becomes discontinuous relative to the leg position (i.e., becomes discontinuous when viewing from the absolute coordinate system fixed on the floor), ZMPfeet does disadvantageously become discontinuous relative to the leg position (i.e., becomes discontinuous when viewing from the absolute coordinate system). However, if the coordinate system is switched during the two-leg period where the feet acceleration is not so large, the magnitude of discontinuity will yield little problem in walking.

As regards 2), its accuracy of approximation is better than 1). Further, since the point of action P becomes continuous relative to the leg position, ZMPfeet does accordingly become continuous relative to the leg position.

As regards 3), its accuracy of approximation is more improved than 2). Further, like 2), ZMPfeet is continuous relative to the leg position.

Then, the calculation of leg's total inertial force moment will additionally be commented.

The foot material point trajectory is a trajectory determined from the foot motion parameters. The trajectory of the foot position and posture to be used in determining the foot material point trajectory need not be equal to the foot position and posture in the desired gait outputted from the gait generator 100. For example, if the foot in the desired gait should rotate, the foot position and posture trajectory to be used in determining the foot material point trajectory may be a trajectory in which the foot is kept horizontal. Unless the accuracy is degraded greatly, the amount of foot lifting or some similar parameters may be altered in the trajectory.

The leg material point may be set as follows:

1) to set at a predetermined point in the foot;
2) to set at a point shifted vertically from the aforesaid predetermined point by a prescribed distance;
3) to set at a plurality of points in the foot. The foot may set with inertia.

Any of the above can satisfy the aforesaid Condition b).

Additionally commenting on the setting of the material point offset of the body and leg, if the material point offset values of the body and leg may be set to fixed values, there will yield little problem. Alternatively, they may be corrected in response to the gait parameters in order to decrease the modeling error of the center of gravity as little as possible. Although the horizontal position of the inverted pendulum is made corresponding to the horizontal position of the body-representing point, it may alternatively be made to be corresponding to the center of gravity of the robot, as a whole, or to the center of gravity of the robot excluding legs or a leg.

Although the height of the inverted pendulum may be changed in response to the gait parameters, it is preferable to set the height to a fixed value during a short period of time (such as during one waking step) in order to facilitate future behavior prediction.

Additionally commenting on the calculation of the divergent component induced by the leg motion, the divergent component induced by the leg motion may be determined directly from the gait parameters in an approximation manner, without generating the leg motion at every control cycle. For example, by approximating that the leg ZMP is at an average value between the feet's center of gravity at the initial of the gait and that at the terminal of the gait during one step walking, a product obtained by multiplying the average value with H(1, T) will be a value that approximates a value obtained by converting the divergent component induced by the leg motion by into impulse at time 0.

The terminal divergent component induced by the leg motion is expressed by a function that inputs the gait parameters (in particular, the leg motion parameter and time parameter). Accordingly, if mapped data that shows the relationship between the gait parameters and the terminal divergent component induced by the leg motion, the volume of calculation will be decreased, although additional capacity of memory is needed. Either method can be utilized.

It will be possible to combine these aforesaid alternatives together. For example, the method of leg ZMP calculation to calculate the ZMP correction amount (in predicting future behavior) and the method of leg ZMP calculation to calculate the instantaneous value in the current control cycle need not be strictly equal to each other. Since the influence of the initial divergent component is taken into account when calculating the ZMP correction amount, if the divergent component deviates by a small difference (occurring between them), a correction will be made to suppress the divergence when conducting gait generation in the next walking step.

It should be noted that, although the gait is corrected or changed when the time t is zero in S10 in the flow chart of FIG. 12 in the first embodiment, the gait may be corrected or changed at any time other than that. If doing so, it suffices if the current time is deemed as the initial time of the current time gait. In other words, it suffices if a period of time of the current time gait is ranged from the current time to the current time gait's terminal.

It should further be noted that the block diagram illustrated in FIG. 6 may be altered insofar as equivalent operation is possible.

In the foregoing embodiments, although the present invention has been described with reference to a biped robot, the present invention can also be applied to any other legged mobile robots having legs of three or more.

INDUSTRIAL FIELD IN WHICH THE INVENTION IS APPLICABLE

According to the present invention, there is provided a gait generation system of a legged mobile robot that has the dynamic model expressing the relationship between the motion of the body and leg and the floor reaction force, and provisionally determines the current time gait parameters including at least parameters that determine leg trajectory and the like in response to a demand, corrects the current time gait parameters such that the body trajectory (determined based on the dynamic model and the parameters of the current time gait and a periodic gait succeeding thereto) substantially converges or becomes equal to a body trajectory determined from the parameters of the periodic gait, and determines instantaneous values of the current time gait based on the corrected current time gait parameter. With this, the system can generate, freely and on a real-time basis, a gait of any stride, turning angle and walking period, including the floor reaction force acting on the legged mobile robot, that satisfies the dynamic equilibrium condition.

Further, the system can generates a gait in such a manner that the displacement and velocity of each robot part are continues at the boundary of the generated gait and that succeeding thereto, can generate a gait that is high in the margin of stability, can predict future behavior of the robot to generate a gait such that no disadvantages such as posture divergence occurs. Furthermore, the system can ensure real-time gait generation with high speed calculation.

What is claimed is:

1. A system for generating a gait of a legged mobile robot having at least a body and a plurality of legs each connected to the body, comprising:

a. a dynamic model that expresses relationship between motion of the leg and the body, and a floor reaction force;

b. current time gait parameter provisionally-determining means for provisionally determining parameters of a current time gait including at least parameters determining a trajectory of the leg and a trajectory of the floor reaction force, in response to at least a demand;

c. periodic gait parameter supposing means for supposing the parameters of a periodic gait succeeding to the current time gait in response to at least the demand;

d. current time gait parameter correcting means for correcting at least the provisionally determined parameters of the current time gait such that the trajectory of the body determined based on the dynamic model and the parameters of the current time gait and the periodic gait succeeding thereto substantially converges or become equal to a trajectory of the body of the periodic gait determined from the parameters of the periodic gait; and e. current time gait instantaneous value determining means for determining instantaneous values of the current time gait based on at least the corrected parameters of the current time gait.

2. A system according to claim 1, wherein a transitional gait is inserted between the current time gait and the periodic gait succeeding thereto.

3. A system according to claim 2, wherein the transitional gait includes a standstill gait.

4. A system according to claim 1, wherein the floor reaction force includes at least a ZMP.

5. A system for generating a gait of a legged mobile robot having at least a body and a plurality of legs each connected to the body, comprising:

a. a dynamic model that expresses relationship between motion of the leg and the body, and a floor reaction force;

b. current time gait parameter provisionally-determining means for provisionally determining parameters of a current time gait including at least parameters determining a trajectory of the leg and a trajectory of the floor reaction force, in response to at least a demand;

c. periodic gait parameter supposing means for supposing the parameters of a periodic gait succeeding to the current time gait in response to at least the demand;

d. periodic gait boundary divergent component determining means for determining a periodic gait boundary divergent component that is a value indicating a divergent component at gait boundary when behavior of the body of the periodic gait is approximated by the dynamic model, based on the parameters of the periodic gait;

e. current time gait parameter correcting means for correcting the parameters of the current gait such that the divergent component becomes equal to or becomes substantially equal to each other at terminal of the current gait generated with use of the dynamic model; and f. current time gait instantaneous value determining means for determining instantaneous values of the current time gait based on at least the corrected parameters of the current time gait.

6. A system according to claim 5, wherein a transitional gait is inserted between the current time gait and the periodic gait succeeding thereto.

7. A system according to claim 5, wherein the floor reaction force includes at least a ZMP.

8. A system for generating a gait of a legged mobile robot having at least a body and a plurality of legs each connected to the body, comprising:

a. leg reaction force calculating means for calculating a leg reaction force that is a resultant force of inertial force and gravity induced by a motion of the leg, without depending on behavior of the body;

b. inverted pendulum model supporting point position calculating means for calculating a position of a supporting point of an inverted pendulum that describes dynamic behavior of the body, from at least the calculated leg reaction force and a desired floor reaction force;

c. inverted pendulum displacement calculating means for calculating displacement of the inverted pendulum based on at least the calculated position of the supporting point of the inverted pendulum;

d. body position calculating means for calculating a position of the body based on at least the calculated displacement of the inverted pendulum; and e. gait generating means for generating a gait based on at least the calculated position of the body.

9. A system according to claim 8, wherein the inverted pendulum is a linear model.

10. A system according to claim 8, wherein the floor reaction force includes at least a ZMP.

11. A system for generating a gait of a legged mobile robot having at least a body and a plurality of legs each connected to the body, comprising:

a. leg ZMP calculating means for calculating a leg ZMP that is corresponding to a ZMP of the leg that is a pseudo value of a resultant force of inertial force and gravity induced by a motion of the leg, without depending on behavior of the body;

b. inverted pendulum model supporting point position calculating means for calculating a position of a supporting point of an inverted pendulum that describes dynamic behavior of the body, from at least the calculated ZMP and a desired ZMP;

c. inverted pendulum displacement calculating means for calculating displacement of the inverted pendulum based on at least the calculated position of the supporting point of the inverted pendulum;

d. body position calculating means for calculating a position of the body based on at least the calculated displacement of the inverted pendulum; and e. gait generating means for generating a gait based on at least the calculated position of the body.

12. A system according to claim 11, wherein the inverting pendulum model supporting point calculating means calculates the supporting point of the inverted pendulum by subtracting a product obtained by multiplying the leg ZMP by a second coefficient from a product obtained by multiplying the desired ZMP by a first coefficient.

13. A system according to claim 11, wherein the inverted pendulum is a linear model.

14. A system for generating a gait of a legged mobile robot having at least a body and a plurality of legs each connected to the body, comprising:

a. a dynamic model having;
   a leg reaction force calculating means for calculating a leg reaction force that is a resultant force of inertial force and gravity induced by a motion of the leg, without depending on behavior of the body;
   inverted pendulum model supporting point position calculating means for calculating a position of a supporting point of an inverted pendulum that describes dynamic behavior of the body, from at least the calculated leg reaction force and a desired floor reaction force;

inverted pendulum displacement calculating means for calculating displacement of the inverted pendulum based on at least the calculated position of the supporting point of the inverted pendulum; and body position calculating means for calculating a position of the body based on at least the calculated displacement of the inverted pendulum;

b. current time gait parameter provisionally-determining means for provisionally determining parameters of a current time gait including at least parameters determining a trajectory of the leg and a trajectory of the floor reaction force, in response to at least a demand;

c. periodic gait parameter supposing means for supposing the parameters of a periodic gait succeeding to the current time gait in response to at least the demand;

d. periodic gait boundary divergent component determining means for determining a periodic gait boundary divergent component that is a value indicating a divergent component at gait boundary when behavior of the body of the periodic gait is approximated by the dynamic model, based on the parameters of the periodic gait;

e. current time gait parameter correcting means for correcting the parameters of the current gait such that the divergent component becomes equal to or becomes substantially equal to each other at terminal of the current gait generated with use of the dynamic model; and f. current time gait instantaneous value determining means for determining instantaneous values of the current time gait based on at least the corrected parameters of the current time gait.

15. A system according to claim 14, wherein the floor reaction force includes at least a ZMP.

16. A system according to claim 14, wherein the inverted pendulum is a linear model.

* * * * *